United States Patent [19]
Kim et al.

[11] Patent Number: 4,836,676
[45] Date of Patent: Jun. 6, 1989

[54] PHASE READING FIBER OPTIC INTERFEROMETER

[75] Inventors: Byoung Y. Kim; Herbert J. Shaw, both of Stanford, Calif.

[73] Assignee: The Board of Trustees of the Leland Stanford Junior University, Stanford, Calif.

[21] Appl. No.: 946,628

[22] Filed: Dec. 29, 1986

Related U.S. Application Data

[63] Continuation of Ser. No. 603,630, Apr. 25, 1984, abandoned.

[51] Int. Cl.[4] .................. G01B 9/02; G01C 19/64
[52] U.S. Cl. ........................................ 356/350
[58] Field of Search ............................. 356/350

[56] References Cited

U.S. PATENT DOCUMENTS

| | | | |
|---|---|---|---|
| 3,512,890 | 5/1970 | McLaughlin | 356/350 |
| 4,299,490 | 11/1981 | Cahill et al. | 356/350 |
| 4,372,685 | 2/1983 | Ulrich | 356/350 |
| 4,410,275 | 10/1983 | Shaw et al. | 356/350 |
| 4,556,321 | 12/1985 | Schiffner | 356/350 |
| 4,564,293 | 1/1986 | Newton | 356/350 |

FOREIGN PATENT DOCUMENTS

| | | |
|---|---|---|
| 1154955 | 12/1980 | Canada . |
| 3104786 | 9/1982 | Fed. Rep. of Germany . |
| 1141727 | 1/1969 | United Kingdom . |
| 2100855 | 6/1981 | United Kingdom . |
| 83/04305 | 12/1983 | World Int. Prop. O. . |

OTHER PUBLICATIONS

"Fiber Optic Laser Gyro Signal Detection and Processing Technique", Martin et al., SPIE, vol. 139, pp. 98–102, 1978.

Davis, J. L. and Ezekiel, S. "Techniques for Shot Noise Limited Inertial Rotation Measurement Using a Miltiturn Fiber Sagnac Interferometer," *S.P.I.E.*, vol. 157, 1978.

Lefevre, H., "Contribution a la Gyrometrie a Fibre Optique de Classe Inertielle," Thesis Presentation at the University of Nice, Jul. 1, 1982.

Davis, J. L. and Ezekiel, S., "Closed–Loop Low–Noise Fiber–Optic Rotation Sensor, " *Optic Letters*, vol. 6, No. 10, Oct. 1981.

Kim, B. Y., Lefevre, H. C., Bergh, R. A. and Shaw, H. J., "Harmonic Feed–Back Approach to Fiber Gyro Scale Factor Stabilization," *International Conference on Optical Fibre Sensors*, London, Apr. 26–28, 1983.

Giles, I. P. et al., "Coherent Optical–Fibre Sensors With Modulated Laser Sources," *Electronics Letters*, vol. 19, No. 1, pp. 14–15, Jan. 6, 1983.

Henning, M. L. et al., "Optical Fibre Hydrophones With Down Lead Insensitivity," *Proceedings of the First International Conference on Optical Fibre Sensors*, London, pp. 23–27, 1983.

Eberhard, D. et al. "Fiber Gyroscope With Phase–Modulated Single–Sideband Detection," *Optics Letter*, vol. 20, No. 1, Jan. 1984, pp. 22–24, Optical Society of America.

(List continued on next page.)

*Primary Examiner*—Davis L. Willis
*Assistant Examiner*—S. A. Turner
*Attorney, Agent, or Firm*—Knobbe, Martens, Olson & Bear

[57] ABSTRACT

A system and method for detecting the influence of selected forces on an interferometer over an extended dynamic range. One presently preferred embodiment is disclosed for detecting rotation of an interferometer. In this embodiment, an open-loop, all-fiber-optic gyroscope provides an output signal comprising the phase difference of two light waves which are counterpropagating within the gyroscope, and which are phase modulated at a selected frequency. The phase difference of the light waves is influenced by the rotation rate of the interferometer. The output signal is amplitude modulated at the phase modulation frequency to transpose the optical phase shift into a low frequency electronic phase shift, which is measured using a digital time interval counter. A linear scale factor is achieved through use of this system and method.

43 Claims, 11 Drawing Sheets

OTHER PUBLICATIONS

Ralph A. Bergh et al., "An Overview of Fiber-Optic Gyroscopes", *Journal of Lightwave Technology*, vol. LT-2, No. 2, Apr. 1984.

R. Ulrich, "Fiber-Optic Rotation Sensing With Low Drift", *Optics Letters*, vol. 5, No. 5, May 1980.

R. A. Bergh et al., "All-Single-Mode Fiber-Optic Gyroscope", *Optics Letters*, vol. 6, No. 4, Apr. 1981.

R. A. Bergh et al., "All-Single-Mode Fiber-Optic Gyroscope with Long-Term Stability", Optics Letters, vol. 6, No. 10, Oct. 1981.

H. C. Lefevre et al., "All-Fiber Gyroscope With Inertial-Navigation Short-Term Sensitivity", Optics Letters, vol. 7, No. 9, Sep. 1982.

B. Y. Kim et al., "Response of Fiber Gyros of Signals Introduced at the Second Harmonic of the Bias Modulation Frequency", SPIE Conference Proceedings Held in San Diego, CA, vol. 425, pp. 86–89, Aug. 1983.

Fig. 5 (PRIOR ART)
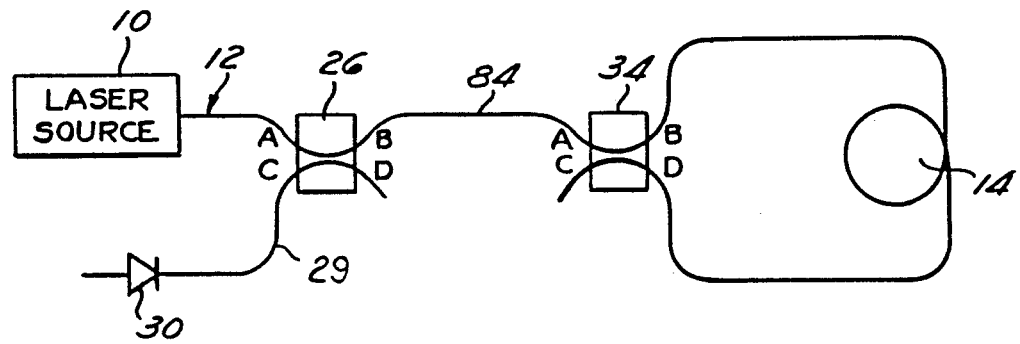
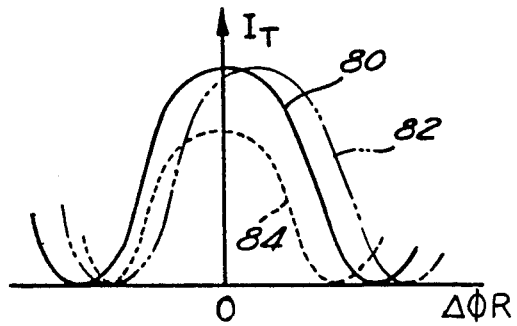
Fig. 6 (PRIOR ART)

ZERO ROTATION CASE

PHASE MODULATED AT fm
WITH CONSTANT ROTATIONAL VELOCITY

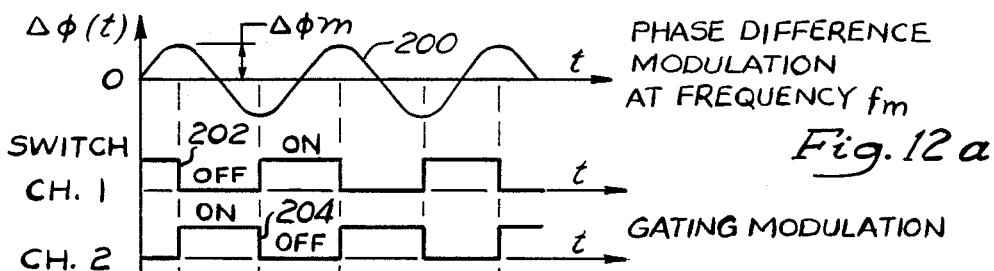
Fig. 12a — PHASE DIFFERENCE MODULATION AT FREQUENCY $f_m$
Fig. 12b — GATING MODULATION
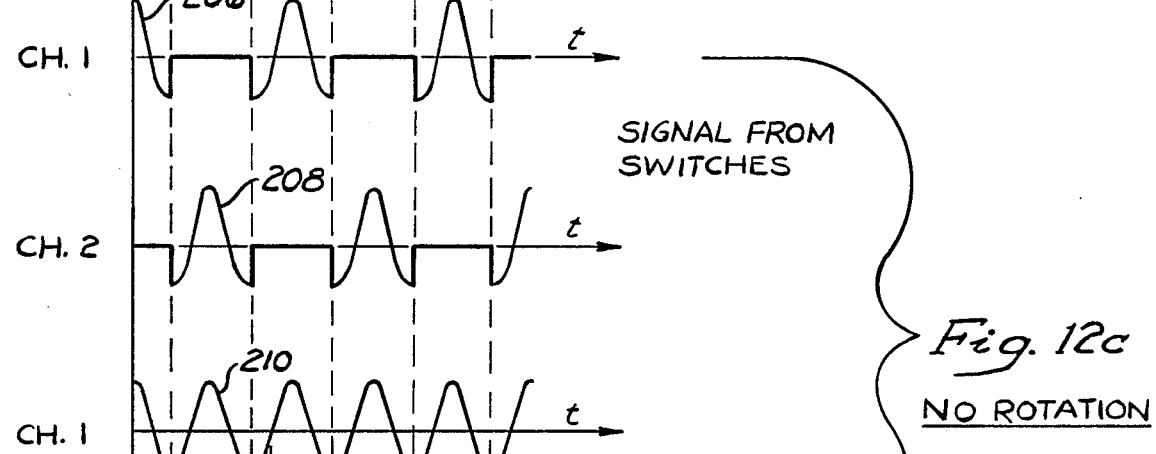
Fig. 12c — NO ROTATION
SIGNAL FROM SWITCHES
BANDPASS FILTER OUTPUT AT $2f_m$
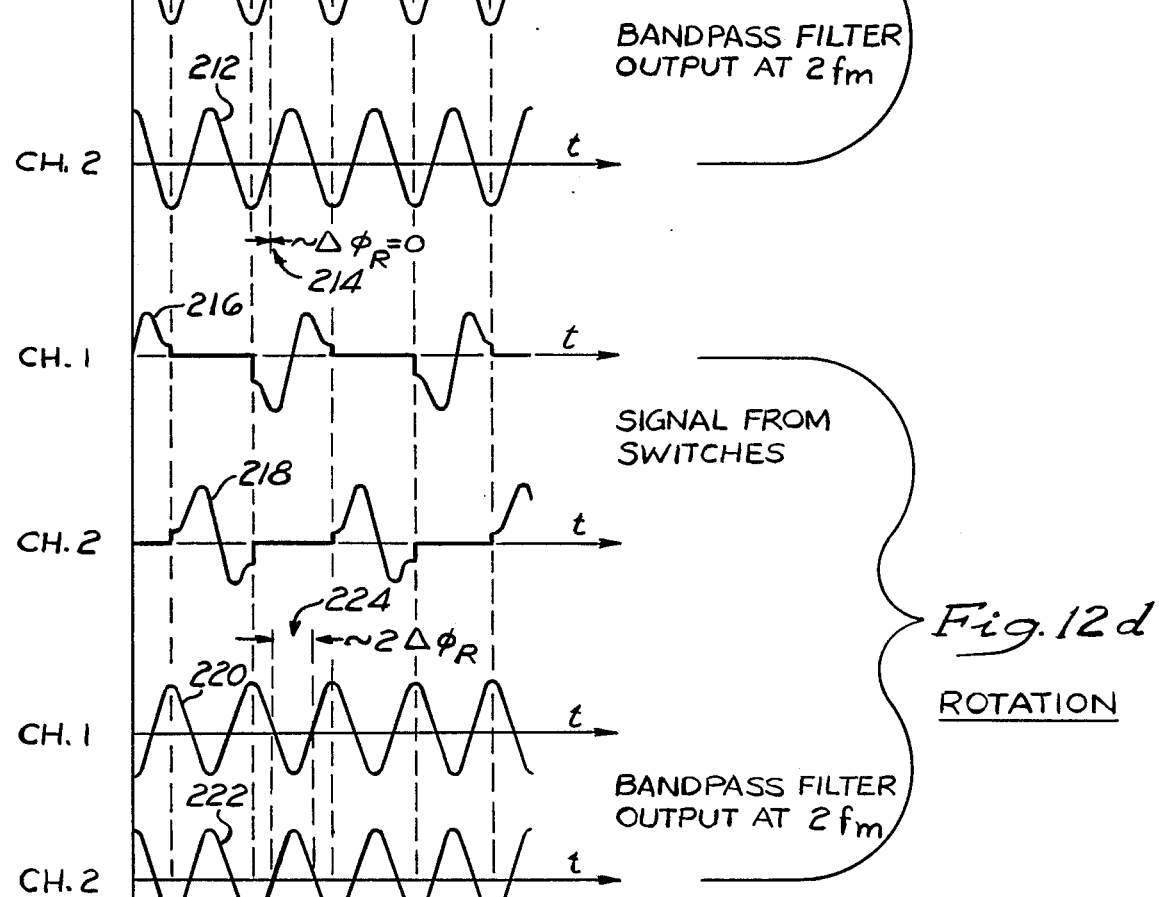
Fig. 12d — ROTATION
SIGNAL FROM SWITCHES
BANDPASS FILTER OUTPUT AT $2f_m$

PHASE READING FIBER OPTIC INTERFEROMETER

This application is a continuation, of application Ser. No. 603,630, filed Apr. 25, 1984, now abandoned.

BACKGROUND OF THE INVENTION

The present invention relates to interferometers, and particularly to a phase reading all fiber optic interferometer which includes a method and apparatus for measuring phase difference signals from the interferometer over an extended dynamic range of operation.

Interferometers typically comprise devices which provide for the propagation of two interfering light waves, with the phase difference between the light waves being dependent upon the difference in the respective optical path lengths traveled by the two light waves within the interferometer. The phase difference between the two interfering waves can also be influenced by external forces such as rotation of the interferometer. Thus, interferometers generally provide an output signal whose intensity is dependent upon the phase difference between the waves. Various methods and devices for detecting and measuring this phase difference have been devised, but each has been shown to have problems or limitations under certain operating conditions.

Devices for measuring the phase difference have often found application in interferometers which are used for rotation sensing. Thus, although the method and apparatus disclosed herein for detecting and measuring the phase difference output signal is useable with all conventional interferometers, its configuration and operation may best be described in connection with fiber optic rotation sensors, which comprise one preferred embodiment of the invention.

Fiber optic rotation sensors typically comprise a loop of fiber optic material to which light waves are coupled for propagation around the loop in opposite directions. Rotation of the loop creates a relative phase difference between counter-propagating waves, in accordance with the well known "Sagnac effect", with the amount of phase difference corresponding to the velocity of rotation. The counter-propagating waves, when recombined, interfere constructively or destructively to produce an optical output signal which varies in intensity in accordance with the rotation rate of the loop. Rotation sensing is commonly accomplished by detection of this optical output signal.

Various techniques have been devised to increase the sensitivity of fiber optic rotation sensors to small rotation velocities. For example, one open-loop technique involves phase modulating the counter-propagating light waves at a first harmonic frequency. The rotation rate may then be determined by phase sensitive detection of a component in the optical output signal at the phase modulation frequency. The amplitude of this component is proportional to the rotation rate. However, this technique is not available for detecting large rotation rates because the optical output signal defines a waveform which repeats itself periodically as the rotation rate increases or decreases. Thus, the amplitude of the measured component is the same at each periodic repetition of the output signal, even though the associated loops rotation rate is different. In addition, the sensitivity of the device becomes essentially zero at some locations on the repeating signal waveform, causing a nonlinear response of the device. Such techniques are difficult to use in many applications requiring rotation sensing over an extended dynamic range.

Another technique which involves an open-loop configuration involves a single sideband detection scheme such as the one described in D. Eberhard and E. Voges, "Fiber Gyroscope with Phase-Modulated Single-Sideband Detection," Opt. Lett. 9, 22 (1984). However, this approach is not feasible since it requires a wide band phase modulator which is not presently available in fiber-optic form.

Still another approach to rotation sensing involves a signal processing technique, as described in K. Bohm, P. Marten, E. Weidel, and K. Peterman, "Direct Rotation-Rate Detection With A Fiber-Optic Gyro By Using Digital Data Processing," Electron. Lett. 19, 997 (1983). In this approach, like the technique described above, the counter-propagating waves are phase modulated at a selected frequency. An odd harmonic and an even harmonic of the output signal are each measured, and these signals are processed and combined to define the tangent of the phase shift caused by rotation of the loop. The rotation rate may then be calculated from this information. Because of the limited range of presently available analog to digital converters which are used with this device, the device cannot provide the necessary dynamic range at the resolution which is required in many gyroscope applications, such as many types of navigation.

In order to overcome some of the problems associated with the techniques described above, various other closed loop approaches have been developed. For example, several closed loop techniques include phase modulation of the counter-propagating light waves at a selected frequency. The optical output signal produced by the light waves is monitored to detect rotation of the loop. When rotation is detected, a feedback signal is produced which controls the phase modulation signal which is applied to the counter-propagating light waves. In response to the feedback signal, the amplitude of the phase modulation signal is adjusted to null out the component in the optical output signal produced by the loop rotation. Thus, the amplitude of the phase modulation signal comprises a measure of the loop's rotation rate.

These closed loop techniques provide the same sensitivity level which is available in open-loop devices, while also significantly increasing the dynamic range over which the rotation rate may be accurately measured. However, the precision and range of these rotation sensors is limited in application by the capabilities of the various output devices to which the sensors may be connected. For example, the output devices must have a range and resolution which permits measurement of the amplitude of the phase modulation signal for large, as well as very small rotation rates. Output devices to be used with these systems are not presently available with both sensitivity levels and dynamic ranges which approach the requirements for applications such as aircraft navigation. In addition, these systems are inherently more complex than the open-loop systems due to the additional electronic circuitry included therein.

In light of the above, it would be a great improvement in the art to provide an open-loop rotation sensing system and method wherein the rotation rate of an all-fiber-optic gyroscope could be precisely, unambiguously and linearly determined over an extended dynamic range. It would be a further important improvement to provide such a system and method which would utilize presently existing components to produce digital readout of the rotation rate over a substantially unlimited dynamic range.

BRIEF SUMMARY OF THE INVENTION

The present invention comprises an apparatus and method for detecting and measuring the influence of selected external forces on an interferometer over an extended dynamic range of operation. The appratus includes an interferometer having a detector for providing an output comprised of two interfering light waves which propagate within the interferometer. The phase difference between the interfering light waves is dependent upon the difference in the respective optical path lengths traveled by the light waves within the interferometer, and upon the influence of external forces such as pressure, temperature and rotation of the interferometer. The intensity of the output is dependent upon the phase difference of the light waves, and thus is also dependent upon the external forces applied to the interferometer.

A first circuit amplitude modulates the output to produce a first signal having selected harmonics which contain both sine and cosine components of the output. A second circuit functions in response to the first signal to provide a second signal which is representative of shifts in the phase difference of the interfering light waves caused by the external forces.

In one preferred embodiment, the invention comprises an open-loop rotation sensor and method of its operation for use in accurately and reliably sensing a broad range of rotational velocities and providing a phase of a low frequency signal which corresponds to the sensed rotation. The rotation sensor comprises all fiber optic components, such as a fiber optic directional coupler which (a) splits the light from the source into two waves that propagate around the sensing loop in opposite directions, and (b) combines the counter-propagating waves to provide an optical output signal. Proper polarization of the applied light, the counter-propagating waves, and the optical output signal is established, controlled, and maintained by a fiber optic polarizer and fiber optic polarization controllers. A second fiber optic coupler is provided to couple the optical output signal from the continuous strand to a photodetector which outputs an electrical signal that is proportional to the intensity of the optical signal.

Improved operating stability and sensitivity of the rotation sensor is achieved by phase modulating the counter-propagating waves at a selected frequency through use of a phase modulator, and thereby biasing the phase of the optical output signal. The optical intensity output signal from the photodetector is amplitude modulated at the phase modulation frequency to transpose the optical phase shift into a phase shift of a low frequency electronic signal. The modulated signal is filtered to select one of its harmonic frequencies.

In one preferred embodiment, the amplitude modulation is accomplished by an electronic switch which alternately transmits the amplitude modulated signal to one of two channels at the phase modulation frequency. Thus, the signals in the two channels are square wave modulated at the modulation frequency, and are 180° out of phase with each other. A component of each of the signals in the channels is selected at a harmonic of the modulation frequency by band pass filters, and the phase difference of these components is determined in a phase meter. This phase difference comprises a value of two times the phase difference produced in the counter-propagating waves by the rotation rate. In one preferred embodiment, the phase meter is a time interval counter which produces a very accurate digital output signal which may be readily used in conventional digital output devices.

In another preferred embodiment, the intensity output signal is amplitude modulated by a conventional electronic gate, and the phase of a selected harmonic of the amplitude modulated signal is measured against that of a corresponding harmonic of the phase modulation signal. This measurement may be made in a phase meter as described above to produce a digital value corresponding to the phase difference produced in the counter-propagating waves by rotation of the loop. Optionally, amplitude modulation could be performed in the optical loop through use of an optical gate such as a shutter.

These and other objects and features of the present invention will become more fully apparent from the following description and appended claims taken in conjunction with the accompanying drawings.

BRIEF DESCRIPTION OF THE DRAWINGS

FIG. 5 is a schematic diagram of the rotation sensor of FIG. 1 with the polarizer, polarization controllers, and phase modulator removed therefrom;

FIG. 6 is a graph of the intensity of the optical output signal, as measured by the photodetector, as a function of the rotationally induced Sagnac phase difference, illustrating the effects of birefringence induced phase differences and birefringence induced amplitude fluctuations;

FIG. 12 is a diagram illustrating the relationship of phase and amplitude modulation signals with switch and filter output signals during conditions of both rest and rotation of the optical loop associated with the rotation sensor illustrated in FIG. 10;

FIG. 15 is a diagram illustrating the relationship of phase and amplitude modulation signals with gate and filter output signals during conditions of both rest and rotation of the optical loop associated with the rotation sensor illustrated in FIG. 14.

DETAILED DESCRIPTION OF THE PREFERRED EMBODIMENT

As was indicated above, the invention can best be described by reference to its use in conjunction with a particular type of interferometer in a particular application which comprises one preferred embodiment of the invention. Thus, the invention is described in connection with a Sagnac interferometer for rotation sensing. However, it will be appreciated that the invention can be used with any interferometer in many types of applications.

Figure 1:
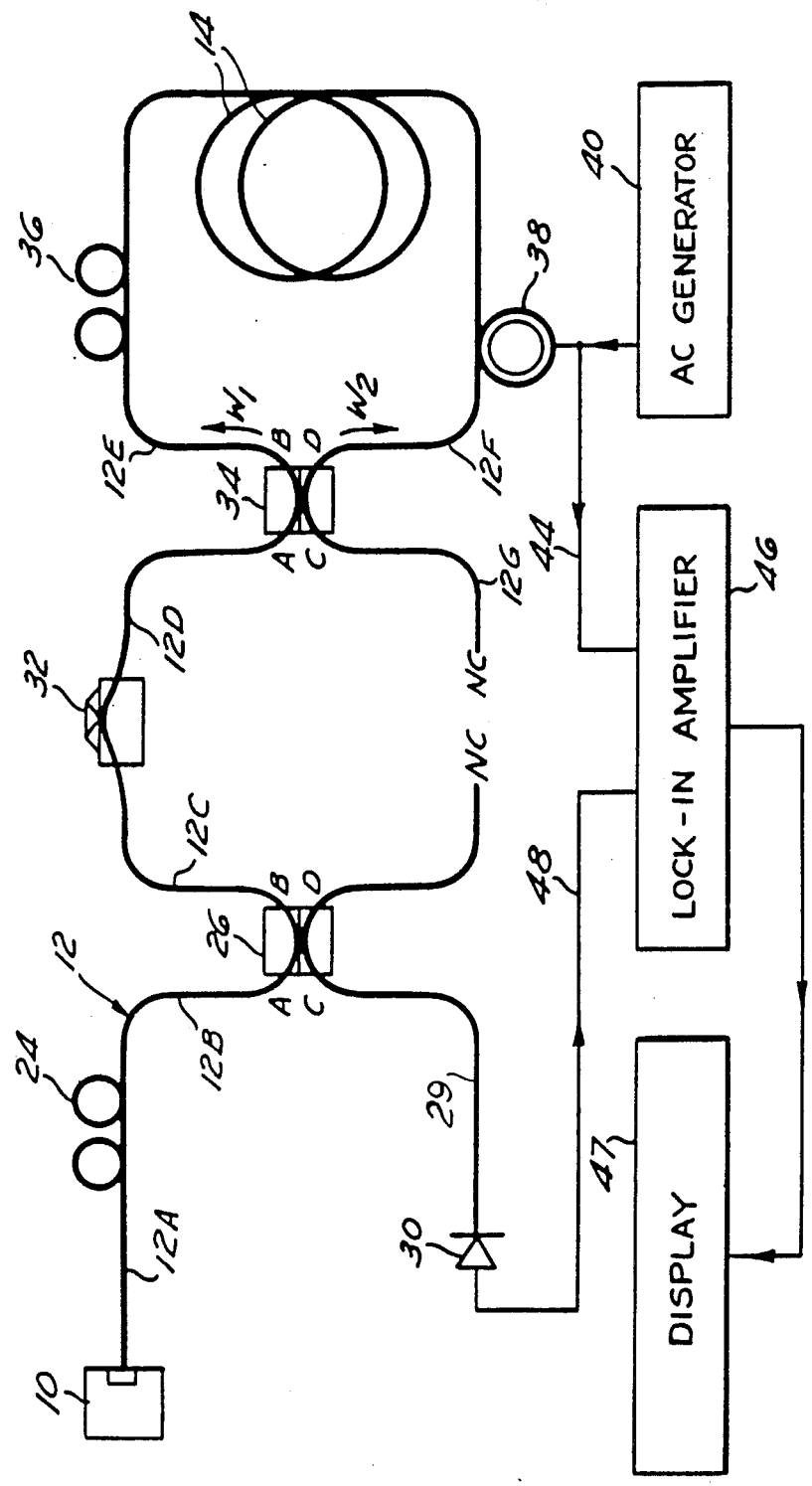
FIG. 1 is a schematic drawing of a basic rotation sensor, showing the fiber optic components positioned along a continuous, uninterrupted strand of fiber optic material, and further showing the signal generator, photodetector, lock-in amplifier, and display associated with the detection system.

Before proceeding with a discussion of one preferred embodiment of the invention, a discussion of the basic rotation sensor used in the invention is necessary for a fuller understanding of the improvement. FIG. 1 shows a rotation sensor having a basic optical loop structure which is of the type used in the present invention. Other components not in the loop are included only for purposes of providing one example of how such systems generally are operated. This rotation sensor includes a light source 10 for introducing light into a continuous length or strand of optical fiber 12, a portion of which is wound into a sensing loop 14. As used herein, the reference numeral 12 designates generally the entire continuous strand of optical fiber, while the numeral 12 with letter suffixes (A, B, C, etc.) designates portions of the optical fiber 12.

In the embodiment shown, the light source 10 comprises a galium arsenide (GaAs) laser which produces light having a wave length on the order of 0.82 microns. By way of specific example, the light source 10 may comprise a model GO-DIP laser diode, commercially available from General Optronics Corp., 3005 Hadley Road, South Plainfield, N.J. The fiber optic strands such as the strand 12 are preferably single mode fibers having, for example, an outer diameter of 80 microns and a core diameter of 4 microns. The loop 14 comprises a plurality of turns of the fiber 12 wrapped about a spool or other suitable support (not shown). By way of specific example, the loop 14 may have approximately 1000 turns of fiber wound on a form having a diameter of 14 centimeters.

Preferably, the loop 14 is wound symmetrically, starting from the center, so that symmetrical points in the loop 14 are in proximity. It is believed that this reduces the environmental sensitivity of the rotation sensor, since such symmetry causes time varying temperature and pressure gradients to have a similar effect on both of the counter-propagating waves.

Light from the source 10 is optically coupled to one end of the fiber 12 by butting the fiber 12 against the light source 10. Various components for guiding and processing the light are positioned or formed at various locations along the continuous strand 12. For the purpose of describing the relative locations of these components, the continuous fiber 12 will be described as being divided into seven portions, labeled 12A through 12G, respectively, with the portion 12A through 12E being on the side of the loop 14 that is coupled to the source 10, and the portions 12F and 12G being on the opposite side of the loop 14.

Adjacent to the light source 10, between the fiber portions 12A and 12B, is a polarization controller 24. A type of polarization controller suitable for use as the controller 24 is described in detail in U.S. Pat. No. 4,389,090, issued June 21, 1983, entitled "Fiber Optic Polarization Converter", assigned to the assignee of the present invention, and is hereby incorporated by reference. A brief description of the polarization controllers 24 will be provided subsequently. However, it should be presently understood that this controller 24 permits adjustment of both the state and direction of polarization of the applied light.

The fiber 12 then passes through ports labeled A and B of a directional coupler 26, located between the fiber portions 12B and 12C. The coupler 26 couples optical power to a second strand of optical fiber which passes through the ports labeled C and D of the coupler 26, the port C being on the same side of the coupler as the port A, and the port D being on the same side of the coupler as the port B. The end of the fiber 28 extending from the port D terminates nonreflectively at the point labeled "NC" (for "not connected") while the end of the fiber 29 extending from the port C is optically coupled to a photodetector 30. By way of specific example, the photodetector 30 may comprise a standard, reverse biased, silicon, PIN-type, photo diode. The coupler 26 is described in detail in co-pending patent application Ser. No. 300,955, filed Sept. 10, 1981, entitled "Fiber Optic Directional Coupler" and corresponding to European patent application Ser. No. 82304705.5, filed Sept. 8, 1982 and published on Mar. 23, 1983 as Publication No. 0074789, which is a continuation-in-part of patent application Ser. No. 139,511, filed Apr. 11, 1980, entitled "Fiber Optic Directional Coupler", and corresponding to European Patent Application Ser. No. 81102667.3 filed Apr. 8, 1981 and published Oct. 21, 1981 as Publication No. 0038023, both of said patent applications being assigned to the assignee of the present invention. These co-pending patent applications are hereby incorporated by reference.

The fiber portion 12C extending from port B of the coupler 26 passes through a polarizer 32, located between the fiber portions 12C and 12D. A monomode optical fiber has two polarization modes of travel for any light wave. The polarizer 32 permits passage of light in one of the polarization modes of the fiber 12, while preventing passage of light in the other polarization mode. Preferably, the polarization controller 24 mentioned above is used to adjust the polarization of the applied light so that such polarization is substantially the same as the polarization mode passed by the polarizer 32. This reduces the loss of optical power as the applied light propagates through the polarizer. A preferred type of polarizer for use in the present invention is described in detail in U.S. Pat. No. 4,386,822, issued June 7, 1983, entitled "Polarizer and Method", assigned to the assignee of the present invention, and is hereby incorporated by reference.

After passing through the polarizer 32, the fiber 12 passes through ports labeled A and B of a directional coupler 34, located between the fiber portions 12D and 12E. This coupler 34 is preferably of the same type as described above in reference to the coupler 26. The fiber 12 is then wound into the loop 14, with a polarization controller 36 located between the loop 14 and fiber portion 12E. This polarization controller 36 may be of the type discussed in reference to the controller 24, and is utilized to adjust the polarization of the light waves counter-propagating through the loop 14 so that the optical output signal, formed by interference of these counter-propagating waves, has a polarization which will be efficiently passed by the polarizer 32 with minimal optical power loss. Thus, by utilizing both the polarization controllers 24 and 36, the polarization of the light propagating through the fiber 12 may be adjusted for maximum optical power output.

A phase modulator 38 driven by an AC signal generator 40 is mounted in the fiber segment 12F between the loop 14 and the second directional coupler 34. This modulator 38 comprises a PZT cylinder, around which the fiber 12 is wrapped. The fiber 12 is bonded to the cylinder so that when it expands radially in response to the modulating signal from the generator 40, it stretches the fiber 12.

An alternative type of modulator (not shown), suitable for use with the present invention, comprises a PZT cylinder which longitudinally stretches four segments of the fiber 12 bonded to short lengths of capillary tubing at the ends of the cylinder. Those skilled in the art will recognize that this alternative type of modulator may impart a lesser degree of polarization modulation to the propagating optical signal than the modulator 38; however, it will be seen subsequently that the modulator 38 may be operated at a frequency which eliminates the undesirable effects of polarization modulation. Thus, either type of modulator is suitable for use in the present invention.

The fiber 12 then passes through ports labeled C and D of the coupler 34, with the fiber portion 12F extending from the port D and the fiber portion 12G extending from the port C. Fiber portion 12G terminates nonreflectively at a point labeled "NC" (for "not connected").

The output signal from the AC generator 40 is supplied on a line 44 to a lock-in amplifier 46 as a reference signal, which lock-in amplifier 46 also is connected to receive the output of the photodetector 30 by a line 48. This signal on the line 44 to the amplifier 46 provides a reference signal for enabling the amplifier 46 to synchronously detect the detector output signal at the modulation frequency, i.e., the first harmonic component of the optical output signal, of the modulator 38 while blocking all other harmonics of this frequency.

Lock-in amplifiers are well known in the art and are commercially available.

It will be seen below that the magnitude of the first harmonic component of the detector output signal is proportional through a certain limited operating range to the rotation rate of the loop 14. The amplifier 46 outputs a signal which is proportional to this first harmonic component, and thus provides a direct indication of the rotation rate, which may be visually displayed on a display panel 47. However, the scheme of detection shown in FIG. 1 is designed for detection of relatively small rotation rates as will be seen in connection with the discussion of FIG. 9.

The Couplers 26 and 34

Figure 2:
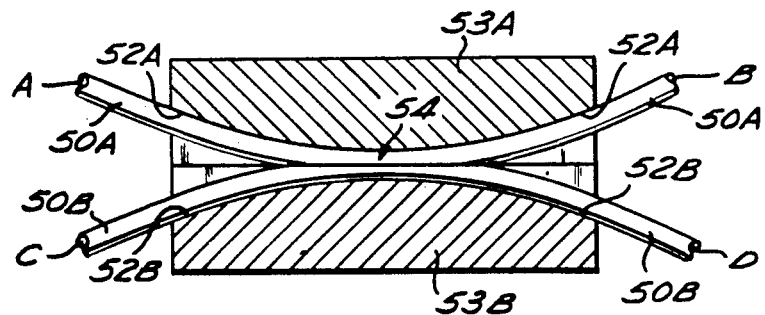
FIG. 2 is a sectional view of one embodiment of a fiber optic directional coupler for use in the rotation sensor of FIG. 1.

A preferred fiber optic directional coupler for use as the couplers 26 and 34 in the rotation sensor or gyroscope of the present invention is illustrated in FIG. 2. The coupler comprises two optical fiber strands labeled 50A, 50B in FIG. 2, of a single mode fiber optic material having a portion of the cladding removed from one side thereof. The two strands 50A and 50B are mounted in respective arcuate slots 52A and 52B, formed in respective blocks 53A and 53B. The strands 50A and 50B are positioned with the portions of the strands where the cladding has been removed in close spaced relationship, to form a region of interaction 54 in which the light is transferred between the core portions of the strands. The amount of material removed is such that the core portion of each strand 50A and 50B is within the evanescent field of the other. The center-to-center spacing between the strands at the center of the coupler is typically less than about 2–3 core diameters.

It is important to note that the light transferred between the strands at the region of interaction 54 is directional. That is, substantially all of the light applied to input port A is delivered to the output ports B and D, without contra-directional coupling to port C. Likewise, substantially all of the light applied to input port C is delivered to the output ports B and D. Further, this directivity is symmetrical. Thus, light supplied to either input port B or input port D is delivered to the output ports A and C. Moreover, the coupler is essentially nondiscriminatory with respect to polarizations, and thus preserves the polarization of the coupled light. Thus, for example, if a light beam having a vertical polarization is input to port A, the light coupled from port A to port D, as well as the light passing straight through from port A to port B, will remain vertically polarized.

From the foregoing, it can be seen that the coupler may function as a beam-splitter to divide the applied light into two counter-propagating waves W1, W2 (FIG. 1). Further, the coupler may additionally function to recombine the counter-propagating waves after they have traversed the loop 14 (FIG. 1).

In the embodiment shown, each of the couplers 26, 34 has a coupling efficiency of fifty percent, as this choice of coupling efficiency provides maximum optical power at the photodetector 30 (FIG. 1). As used herein, the term "coupling efficiency" is defined as the power ratio of the coupled power to the total output power, expressed as a percent. For example, referring to FIG. 2, if light is applied to port A, the coupling efficiency would be equal to the ratio of the power at port D to the sum of the power output at ports B and D. Further, a coupling efficiency of 50% for the coupler 34 insures that the counter-propagating waves W1, W2 are equal magnitude.

The Polarizer 32

Figure 3:
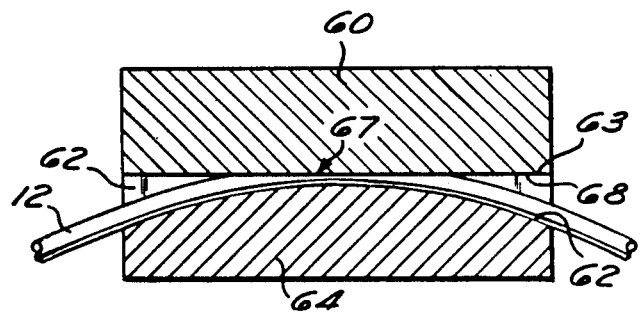
FIG. 3 is a sectional view of one embodiment of a fiber optic polarizer for use in the rotation sensor of FIG. 1.

A preferred polarizer for use in the rotation sensor of the present invention is illustrated in FIG. 3. This polarizer includes a birefringent crystal 60, positioned within the evanescent field of light transmitted by the fiber 12. The fiber 12 is mounted in a slot 62 which opens to the upper face 63 of a generally rectangular quartz block 64. The slot 62 has an arcuately curved bottom wall, and the fiber is mounted in the slot 62 so that it follows the contour of this bottom wall. The upper surface 63 of the block 64 is lapped to remove a portion of the cladding from the fiber 12 in a region 67. The crystal 60 is mounted on the block 64, with the lower surface 68 of the crystal facing the upper surface 63 of the block 64, to position the crystal 60 within the evanescent field of the fiber 12.

The relative indices of refraction of the fiber 12 and the birefringent material 60 are selected so that the wave velocity of the desired polarization mode is greater in the birefringent crystal 60 than in the fiber 12, while the wave velocity of an undesired polarization mode is greater in the fiber 12 than in the birefringent crystal 60. The light of the desired polarization mode remains guided by the core portion of the fiber 12, whereas light of the undesired polarization mode is coupled from the fiber 12 to the birefringent crystal 60. Thus, the polarizer 32 permits passage of light in one polarization mode, while preventing passage of light in the other polarization mode. As previously indicated, the polarization controllers 24, 36 (FIG. 1) may be utilized to adjust the polarizations of the applied light and optical output signal, respectively, so that optical power loss through the polarizer is minimized.

The Polarization Controllers 24, 36

Figure 4:
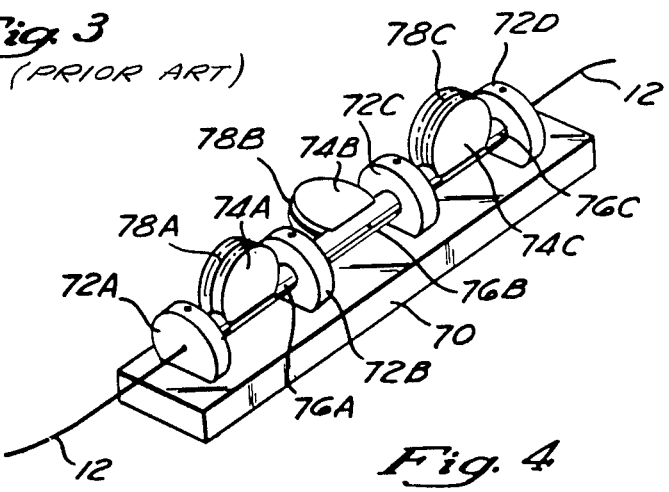
FIG. 4 is a perspective view of one embodiment of a fiber optic polarization controller for use in the rotation sensor of FIG. 1.

One type of polarization controller suitable for use in the rotation sensor of the present invention is illustrated in FIG. 4. The controller includes a base 70 on which a plurality of upright blocks 72A through 72D are mounted. Between adjacent ones of the blocks 72, spools 74A through 74C are tangentially mounted on shafts 76A through 76C, respectively. The shafts 76 are axially aligned with each other, and are rotatably mounted between the blocks 72. The spools 74 are generally cylindrical and are positioned tangentially to the shafts 76.

The strand 12 extends through axial bores in the shafts 76 and is wrapped about each of the spools 74 to form three coils 78A through 78C. The radii of the coil 78 are such that the fiber 12 is stressed to form a birefringent medium in each of the coils 78. The three coils 78A through 78C may be rotated independently of each other about the axis of the shafts 74A through 74C respectively to adjust the birefringence of the fiber 12 and, thus, to control the polarization of the light passing through the fiber 12.

The diameter and number of turns in the coils 78 are such that the outer coils 78A and C provide a spatial delay of one-quarter wave length, while the central coil 78D provides a spatial delay of one-half wave length. The quarter wave length coils 78A and C control the elipticity of the polarization, and the half wave length coil 78 controls the direction of polarization. This provides a full range of adjustment of the polarization of the light propagating through the fiber 12.

It will be understood, however, that the polarization controller may be modified to provide only the two quarter wave coils 78A and C, since the direction of polarization (otherwise provided by the central coil 78B) may be controlled indirectly through proper adjustment of the elipticity of polarization by means of the two quarter wave coils 78A and C. Accordingly, the polarization controllers 24 and 36 are shown in FIG. 1 as including only the two quarter wave coils 78A and C. Since this configuration reduces the overall size of the controllers 24–36, it may be advantageous for certain applications of the present invention involving space limitations.

Thus, the polarization controllers 24 and 36 provide means for establishing, maintaining and controlling the polarization of both the applied light and the counterpropagating waves.

Operation Without Phase Modulation Or Polarization Control

In order to fully understand the function and importance of the polarizer 32 (FIG. 1) and phase modulator 38, the operation of the rotation sensor of FIG. 1 will first be described as if these components had been removed from the system. Accordingly FIG. 5 shows the rotation sensor of FIG. 1 in schematic block diagram form, with the modulator 38, polarizer 32, and associated components removed therefrom.

Light is coupled from the laser source 10 to the fiber 12 for propagation therein. The light enters port A of the coupler 26, where a portion of the light is lost through port D. The remaining portion of the light propagates from port B to port A of the coupler 34, where it is split into two counter-propagating waves W1, W2 of equal amplitude. The wave W1 propagates from the port B in a clockwise direction about the loop 14, while the wave W2 propagates from port D in a counter-clockwise direction around the loop 14.

After the waves W1, W2 have traversed the loop 14, they are recombined by the coupler 34 to form an optical output signal, which propagates from port A of the coupler 34 to port B of the coupler 26. A portion of the optical output signal is coupled from port B to port C of the coupler 26 for propagation along the fiber 29 to the photodetector 30. This photodetector 30 outputs an electrical signal which is proportional to the intensity of the light impressed thereon by the optical output signal.

The intensity of the optical output signal will vary in accordance with the amount and type, i.e., constructive or destructive, of interference between the waves W1, W2 when they are recombined or interfered at the coupler 34. Ignoring, for the moment, the effects of fiber birefringence, the waves W1, W2 travel the same optical path around the loop 14. Thus, assuming the loop 14 is at rest, when the waves W1, W2 are recombined at the coupler 34, they will interfere constructively, with no phase difference therebetween, and the intensity of the optical output signal will be at a maximum. However, when the loop 14 is rotated, the counter-propagating waves W1, W2, will be shifted in phase in accordance with the Sagnac effect, so that when they are superposed at the coupler 34, they destructively interfere to reduce the intensity of the optical output signal. Such Sagnac phase difference between the waves W1, W2, caused by rotation of the loop 14, is defined by the following relationship:

$$\Delta\phi_R = \frac{8\pi NA}{\lambda c} \Omega \tag{1}$$

where:
A is the area bounded by the loop 14 of optical fiber;
N is the number of turns of the optical fiber about the area A;
$\Omega$ is the angular velocity of the loop about an axis which is perpendicular to the plane of the loop; and
$\lambda$ and c are the free space values of the wave length and velocity, respectively, of the light applied to the loop.

The intensity of the optical output signal ($I_T$) is a function of the Sagnac phase difference ($\Delta\phi_R$) between the waves W1, W2, and is defined by the following equation:

$$I_T = I_1 + I_2 + 2\sqrt{I_1 I_2}\, \cos(\Delta\phi_R) \quad (2)$$

where $I_1$ and $I_2$ are the individual intensities of the waves W1, W2, respectively.

From equations (1) and (2) it may be seen that the intensity of optical output signal is a function of the rotation rate ($\Omega$). Thus, an indication of such rotation rate may be obtained by measuring the intensity of the optical output signal, utilizing the detector 30.

FIG. 6 shows a curve 80, which illustrates this relationship between the intensity of the optical output signal ($I_T$) and the Sagnac phase difference ($\Delta\phi_R$) between the counter-propagating waves W1, W2. The curve 80 has the shape of a cosine curve, and the intensity of the optical output signal is at a maximum when the Sagnac phase difference is zero. Where the phase difference between the counter-propagating waves W1, W2 is caused entirely by rotation of the loop 14, the curve 80 will vary symmetrically about the vertical axis. However, as discussed in copending patent application Ser. No. 288,212, entitled "Fiber Optic Rotation Sensor Utilizing Unpolarized Light" and filed July 29, 1981, corresponding to European patent application Ser. No. 82902595.6, filed July 29, 1981 and published July 27, 1983 as Publication No. 0084055, with polarized light an additional, nonreciprocal, phase difference between the counter-propagating waves W1, W2 may be caused by the residual birefringence of the optical fiber 12. This application is hereby incorporated herein by reference. This additional nonreciprocal phase difference will not occur if completely unpolarized light is used.

Birefringence induced phase differences occur because light traveling in each of the two polarization modes of the single mode fiber 12 travels at a different velocity. This creates a nonrotationally induced phase difference between the waves W1, W2, which causes the waves W1, W2 to interfere in a manner that distorts or shifts the curve 80 of FIG. 6. Such a shift is illustrated by the curve 82, shown in phantom lines in FIG. 6.

Such birefringence induced, nonreciprocal phase difference is indistinguishable from a rotationally induced Sagnac phase difference, and is dependent on environmental factors which vary fiber birefringence, such as temperature and pressure. Thus, fiber birefringence is the cause of a major source of error in fiber optic rotation sensors.

Operation With the Polarizer 32

The problem of nonreciprocal operation due to fiber birefringence is solved in the rotation sensor of the present invention by means of the polarizer 32 (FIG. 1) which, as discussed above, permits utilization of only a single polarization mode. When the polarizer 32 is introduced into the system at the point designated by the reference numeral 84 in FIG. 5, light passing through the polarizer 32 propagates into the loop 14 in one selected polarization mode. Further, when the counter-propagating waves are recombined to form the optical output signal, any light that is not of the same polarization as the light applied to the loop is prevented from reaching the photodetector 30, since the optical output signal passes through the polarizer 32. Thus, the optical output signal, as it travels from port A of coupler 34 to port B of coupler 26, will have precisely the same polarization as the light applied to the loop.

Therefore, by passing the input light and optical output signal through the same polarizer 32, only a single optical path is utilized, thereby eliminating the problem of birefringence induced phase difference caused by the different velocities of propagation in the two possible polarization modes. That is, by filtering out all light which is transferred from the selected mode to the unselected mode by the birefringence in the fiber, it is possible to eliminate all light waves in the unselected mode which might gain or lose phase relative to the selected mode because of the different velocity of propagation. Further, it should be noted that the polarization controllers 24, 36 (FIG. 1) may be used to adjust the polarization of the applied light, and optical output signal, respectively, to reduce optical power loss at the polarizer 32, and thus, maximize the signal intensity at the detector 30.

Operation With the Phase Modulator 38

Referring again to FIG. 6, it will be seen that, because the curve 80 is a cosine function, the intensity of the optical output signal is nonlinear for small Sagnac phase differences ($\Delta\phi_R$) between the waves W1, W2. Further, the optical output signal intensity is relatively insensitive to changes in phase difference, for small values of $\Delta\phi_R$. Such nonlinearity and insensitivity makes it difficult to transform the optical intensity ($I_T$) measured by detector 30 into a signal indicative of the rate of rotation of the loop 14 (via equation 1).

Further, although birefringence induced phase differences between the waves W1, W2 are eliminated, as discussed above by use of the polarizer 32, nevertheless cross coupling between polarization modes caused by fiber birefringence occurs. This cross coupling reduces the optical intensity of the optical output signal since the cross coupled light is prevented from reaching the photodetector 30 on the polarizer 32. Thus, changes in fiber birefringence cause the amplitude of the curve 80 of FIG. 6 to vary, for example, as illustrated by the curve 84. It will be understood that curves 80, 82, 84 of FIG. 6 are not drawn to scale.

The foregoing problems are solved in the device of FIG. 1 by means of a synchronous detection system utilizing the phase modulator 38, signal generator 40 and lock-in amplifier 46 shown in FIG. 1.

Figure 7:
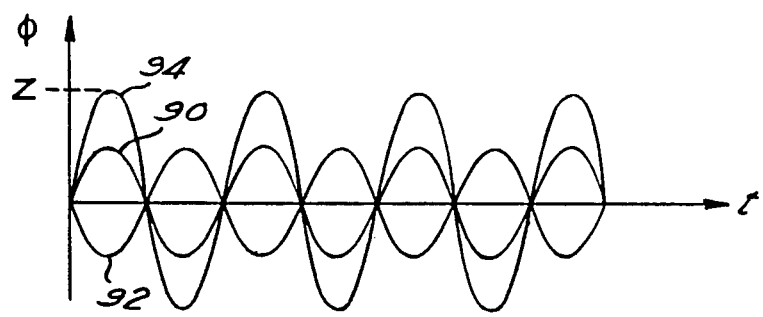
FIG. 7 is a graph of phase difference as a function of time showing the phase modulation of each of the counter-propagating waves and the phase difference between the counter-propagating waves.

Referring to FIG. 7, the phase modulator 38 modulates the phase of each of the counter-propagating waves W1, W2 at the frequency of the signal generator 40. However, as may be seen from FIG. 1, the phase modulator 38 is located at one end of the loop 14. Thus, the modulation of the wave W1 is not necessarily in phase with the modulation of the wave W2. Indeed, it is preferable for proper operation of this synchronous detection system that the modulation of the waves W1, W2 be 180° out of phase. Referring to FIG. 7, it is preferable that the modulation of the wave W1, represented by the sinusoidal curve 90, be 180° out of phase with the modulation of the wave W2, represented by the curve 92. Use of a modulation frequency which provides such 180° phase difference between the modulation of the wave W1 relative to that of W2 is particularly advantageous in that it eliminates modulator induced amplitude modulation in the optical output signal measured by the detector 30. This modulation frequency ($f_m$) may be calculated using the following equation:

$$f_m = \frac{c}{2n_{eq}L} \quad (3)$$

where:
L is the differential fiber length between the coupler 34 and the modulator 38 for the counter-propagating waves W1, W2, i.e., the distance, measured along the fiber, between the modulator 38 and a symmetrical point on the other side of the loop 14;
$n_{eq}$ is the equivalent refractive index for the single mode fiber 12; and
c is the free space velocity of the light applied to the loop 14.

At this modulation frequency ($f_m$) which is called the "proper" frequency, the phase difference ($\Delta\phi_1$) between the counter-propagating waves W1, W2, stemming from phase modulation of these waves in accordance with the curves 90 and 92, is illustrated by the sinusoidal curve 94 in FIG. 7. The curve 94 is obtained by subtracting the curve 92 from the curve 90 to obtain the phase difference between W1 and W2. This modulation of the phase difference between the waves W1, W2 will also modulate the intensity ($I_T$) of the optical output signal in accordance with the curve 80 of FIG. 6 just as a Sagnac phase shift would, since such phase modulation $\Delta\phi_1$ is indistinguishable from rotationally induced Sagnac phase differences $\Delta\phi_R$.

Figure 8:
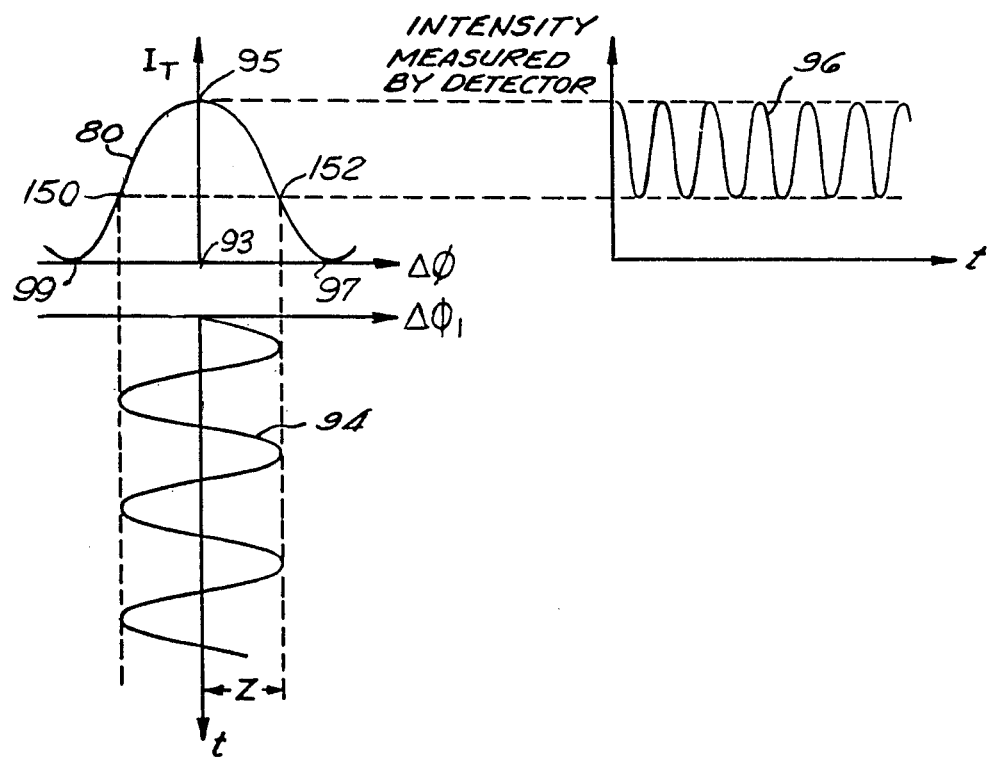
FIG. 8 is a schematic drawing illustrating the effect of the phase modulation upon the intensity of the optical output signal, as measured by the detector, when the loop is at rest.
Figure 9:
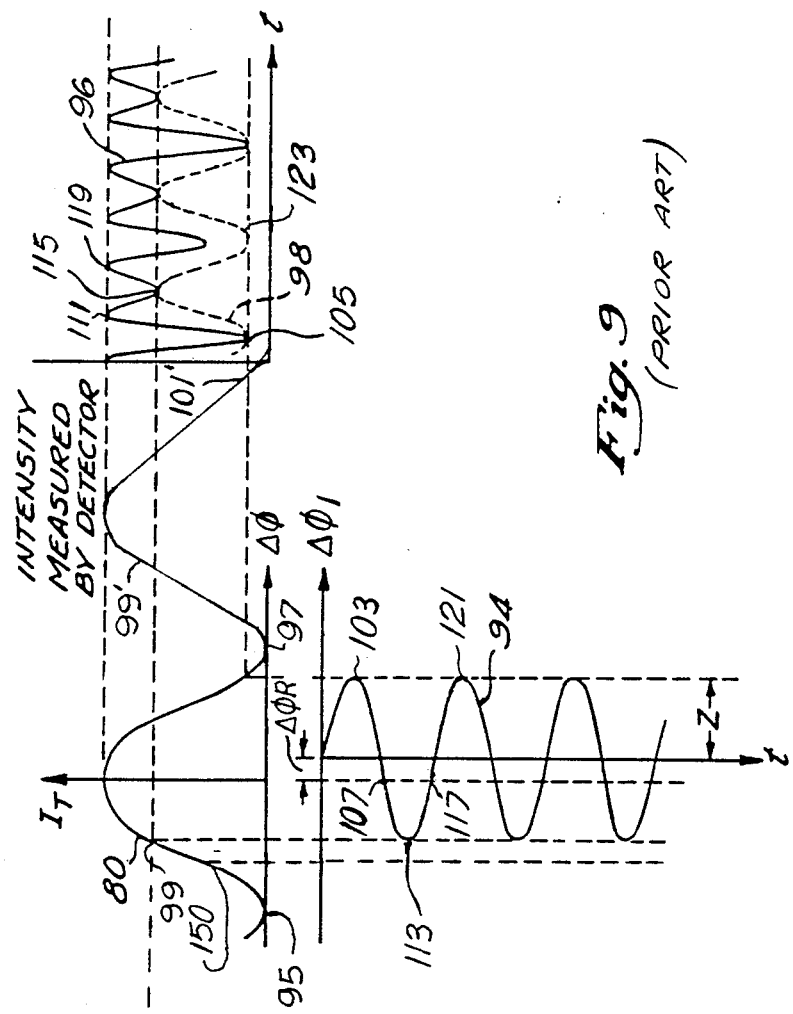
FIG. 9 is a schematic drawing showing the effect of the phase modulation upon the intensity of the optical output signal as measured by the detector when the loop is rotating.

The foregoing may be understood more fully through reference to FIGS. 8 and 9 which graphically illustrate the effect of (a) the phase modulation $\Delta\phi_1$, defined by the curve 94 of FIG. 7, and (b) the Sagnac phase difference $\Delta\phi_R$, upon the intensity ($I_T$) of the optical output signal. Before proceeding with a discussion of FIGS. 8 and 9, it should first be understood that the intensity ($I_T$) of the modulated optical output signal is a function of the total phase difference between the waves W1, W2. Such total phase difference is comprised of both the rotationally induced Sagnac phase difference $\Delta\phi_R$ and the time varying modulation induced phase difference $\Delta\phi_1$. The total phase difference $\Delta\phi$ between the waves W1, W2 may be expressed as follows:

$$\Delta\phi = \Delta\phi_R + \Delta\phi_1 \quad (4)$$

Accordingly, since the effects of the modulation induced phase difference $\Delta\phi_1$, as well as the rotationally induced phase difference $\Delta\phi_R$ will be considered in reference to FIGS. 8 and 9, the horizontal axis for the curve 80 has been relabeled as $\Delta\phi$ to indicate that the total phase difference is being considered, rather tha only the rotationally induced phase difference, as in FIG. 6.

It will be understood tht although the phase difference term $\Delta\phi_R$ is used in reference to the preferred embodiment as representing a rotation induced phase difference, this term, in a generic sense, represents the phase shift induced by whatever external force or physical quantity is being sensed, e.g. rotation, pressure, temperature, etc. Further, those skilled in the art will recognize that Equation (4), and subsequent equations set forth herein, were derived specifically for Sagnac interferometers in which the interfering light waves travel the same optical path. If the invention is utilized in another type of interferometer, such as a Mach-Zehnder interferometer, which is structurally configured to provide different optical paths for the two waves, an additional phase term should be added to define the phase shift attributable to the structurally different optical paths. The addition of the further phase term, however, does not alter the solution for interferometer phase detection, as is provided by the present invention, nor does it affect the analysis of such phase detection as presented herein. Equation (4), above, and equations (5)–(6), (8)–(9) and (11)–(17) may be revised to reflect the structure induced phase difference merely by substituting the quantity ($\Delta\phi_R + \Delta\phi_{St}$) for $\Delta\phi_R$, where $\phi_{St}$ is the phase shift attributable to the structurally different optical paths. Equations (7) and (10), on the other hand, require no such revision to account for this structurally induced phase difference $\phi_{St}$.

Referring now to FIG. 8, the effect of the phase modulation $\Delta\phi_1$ (curve 94) upon the intensity $I_T$ of the optical output signal will be discussed. Curve 80 represents the relationship between the intensity of the optical output signal resulting from two interfering coherent waves to the phase difference $\Delta\phi$ between the waves. When the relative phase angle between them is zero, as illustrated at 93, the resultant intensity of the combined wave is a maximum, as illustrated at 95. When the relative phase between the waves W1 and W2 is non-zero, the combined optical signal will have a lower intensity depending upon the magnitude of the phase difference $\Delta\phi$. The intensity continues to decrease with increasing $\Delta\phi$ until the relative phase difference is either plus or minus 180°, as illustrated at 97 and 99 respectively. At a phase difference of plus or minus 180°, the two counter-propagating waves completely destructively interfere, and the resultant intensity is zero as illustrated at 97 and 99.

In FIG. 8, it is assumed that the loop 14 is at rest, and thus, the optical signal is not affected by the Sagnac effect, Specifically, it may be seen that the modulation induced phase difference curve 94 causes the optical output signal to vary as illustrated by the curve 96. The curve 96 is obtained by translating the points on the curve 94, representing the instantaneous phase difference $\Delta\phi_1$ between W1 and W2 onto the curve 80 representing the resultant optical intensity for a phase difference of that magnitude. When all the points on the curve 94 are translated onto the curve 80, and the corresponding intensities are plotted, the curve 96 results. The translation of the curve 94 through the curve 80 is symmetrical about the vertical axis of the curve 80, so that the optical intensity measured by the detector 30 varies periodically at a frequency equal to the second harmonic of the modulating frequency, as shown by the curve 96.

When the loop 14 is rotated, the counter-propagating waves W1, W2 are shifted in phase, as discussed above, in accordance with the Sagnac effect. The Sagnac phase shift provides a constant phase difference $\Delta\phi_R$ for a constant rotational velocity. This Sagnac phase shift adds to the phase difference $\Delta\phi_1$ created by the modulator 38, so that the entire curve 94 is translated in phase from the position shown in FIG. 8, by an amount equal to $\Delta\phi_R$, as shown in FIG. 9. This causes the optical output signal to vary nonsymmetrically along the curve 80 between the points 99 and 101. This causes an optical output signal as illustrated by curve 96.

The points on the curve 96 are derived as follows. The combined phase difference, illustrated at 103 on curve 94, translates through the point 101 on the curve 80 to the point 105 on the curve 96. The point 107 on the curve 94 translates through the point 109 on the curve 80 to a point 111 on the curve 96. Likewise, the point 113 translates through the point 99 to the point 115, and the point 117 translates through the point 109 to the point 119. Finally, the point 121 translates through the point 101 to the point 123.

The optical output signal 96 has a first harmonic component as illustrated in phantom lines of the sinusoidal curve 98. The peak amplitude of the first harmonic component 98 need not, however, exactly match the amplitude of the optical output signal at point 115 although it might in some cases.

It will be seen subsequently that the RMS value of this sinusoidal curve 98 is proportional to the sine of the rotationally induced Sagnac phase difference $\Delta\phi_R$. Since the amplifier 46 synchronously detects signals having the fundamental frequency of the modulator 38, the amplifier 46 will output a signal that is proportional to the RMS value of the curve 98. This signal can be used to indicate the rotation rate of the loop.

The drawings of FIG. 9 illustrate the intensity waveform of the optical output signal for one direction of rotation (e.g., clockwise) of the loop 14. However, it will be understood that, if the loop 14 is rotated in the opposite direction (e.g., counter-clockwise) at an equal velocity, the intensity waveform 96 of the optical output signal will be exactly the same as illustrated in FIG. 9, except that it will be translated so that the curve 98 is shifted 180° from the position shown in FIG. 9.

The lock-in amplifier 46 detects this 180° phase difference for the curve 98, by comparing the phase of the first harmonic 98 with the phase of the reference signal from the signal generator 40, to determine whether the rotation of the loop is clockwise or counter-clockwise. Depending on the direction of rotation, the amplifier 46 outputs either a positive or negative signal to the display 47. However, regardless of the direction of rotation, the magnitude of the signal is the same for equal rates of rotation of the loop 14.

It will be recalled from the discussion in reference to Equation (3) that, by operating at a specific or "proper" frequency at which the phase difference between the modulation of the waves W1 and W2 is 180°, the odd harmonic frequency components of this amplitude modulation, that are induced in each of the counter-propagating waves W1, W2 by the modulator 38, cancel each other when the waves are superposed to form the optical output signal. Thus, since the above-described detection system detects only an odd harmonic, i.e., the fundamental frequency, of the optical output signal, the effects of the undesired amplitude modulation are eliminated.

A further benefit of operating at the proper frequency is that even harmonics of the phase modulation, induced by the modulator 38 in each of the counter-propagating waves W1, W2, cancel when these waves are superposed to form the optical output signal. Since these even harmonics may, by superposition, produce spurious odd harmonics in the optical signal which might otherwise be detected by the detection system, their elimination improves the accuracy of rotation sensing.

In addition to operating the phase modulator 38 at the frequency defined by Equation (3), it is also preferable in the device of FIG. 1 to adjust the magnitude of the phase modulation so that the amplitude of the detected first harmonic of the optical output signal intensity is maximized, since this provides improved rotation sensing sensitivity and accuracy. It has been found that the first harmonic of the optical output signal intensity is at the maximum, for a given rotation rate, when the amplitude of the modulator induced phase differnce $\Delta\phi_1$ between the waves W1, W2, indicated by the dimension labeled Z in FIGS. 7, 8, and 9, is 1.84 radians. This may be understood more fully through reference to the following equation for the total intensity ($I_T$) of two superposed waves having individual intensities of $I_1$ and $I_2$, respectively, with a phase difference $\Delta\phi$ therebetween.

$$I_T = I_1 + I_2 + 2\sqrt{I_1 I_2} \cos(\Delta\phi) \tag{5}$$

where:

$$\Delta\phi = \Delta\phi_R + \Delta\phi_1 \tag{6}$$

and $$\Delta\phi_1 = Z \sin(2\pi f_m t). \tag{7}$$

Thus, $$\Delta\phi = \Delta\phi_R + Z \sin(2\pi f_m t) \tag{8}$$

The Fourier expansion of cosine $(\Delta\phi)$ is:

$$\cos\Delta\phi = \cos(\Delta\phi_R)\left\{ J_0(z) + 2 \sum_{n=1}^{\infty} J_{2n}(z)\cos[2\pi(2nf_m t)] \right\} + \sin(\Delta\phi_R)\left\{ 2 \sum_{n=1}^{\infty} J_{2n-1}(z)\sin[2\pi(2n-1)f_m t] \right\} \tag{9}$$

where $J_n(z)$ is the $n^{th}$ Bessel function of the variable z, and z is the peak amplitude of the modulator induced phase difference between the waves W1, W2.

Therefore, detecting only the first harmonic of $I_T$ yields:

$$I_{T(1)} = 4\sqrt{I_1 I_2}\, J_1(z)\sin(\Delta\phi_R)\sin(2\pi f_m t) \tag{10}$$

Thus, the amplitude of the first harmonic of the optical output signal intensity is dependent upon the value of the first Bessel function $J_1(z)$. Since $J_1(z)$ is a maximum when z equals 1.84 radians, the amplitude of the phase modulation should preferably be selected so that the magnitude (z) of the modulator induced phase difference $\Delta\phi_1$ between the waves W1, W2 is 1.84 radians.

Reducing the Effects of Backscatter

As is well known, present state-of-the-art optical fibers are not optically perfect, but have imperfections such as density fluctuations in the basic material of the fiber. These imperfections cause variations in the refractive index of the fiber which causes scattering of small amounts of light. This phenomena is commonly referred to as Rayleigh scattering. Although such scattering causes some light to be lost from the fiber, the amount of such loss is relatively small, and therefore, is not a major concern.

The principal problem associated with Rayleigh scattering relates not to scattered light which is lost, but rather to light which is reflected so that it propagates through the fiber in a direction opposite to its original direction of propagation. This is commonly referred to as "backscattered" light. Since such backscattered light is coherent with the light comprising the counter-propagating waves W1, W2, it can constructively or destructively interfere with such propagating waves, and thereby cause variation in the intensity of the optical output signal, as measured by the detector 30.

The portion of backscattered light from one wave which will be coherent with the counter-propagating wave is that which is scattered within a coherence length of the center of the loop 14. Thus, by reducing the coherence length of the source, the coherence between the backscattered light and the counter-propagating waves is reduced. The remaining portion of the backscattered light will be incoherent with the counter-propagating wave, and thus, the interference therebetween will vary randomly so that it is averaged. Therefore, this incoherent portion of the backscattered light will be of substantially constant intensity, and consequently, it will not cause significant variations in the intensity of the optical output signal.

Accordingly, in the present invention, the effects of backscatter are reduced by utilizing as the light source 10, a laser having a relatively short coherence length, for example, one meter or less. By way of specific example, the light source 10 may comprise the model GO-DIP laser diode, commercially available from General Optronics Corp., as mentioned above.

An alternative method of prohibiting destructive or constructive interference between the backscattered waves and the propagating waves involves the inclusion of an additional phase modulator in the system at the center of the fiber loop 14. This phase modulator is not synchronized with the modulator 38.

The propagating waves will pass through this additional phase modulator one time only, on their travel around the loop. For backscatter which occurs from a propagating wave before the wave reaches the additional modulator, the backscatter will not be phase modulated by this additional modulator, since neither its source propagating wave nor the backscatter itself has passed through the additional modulator.

On the other hand, for backscatter which occurs from a propagating wave after the wave passes through this additional phase modulator, the backscatter will be effectively twice phase modulated, once when the propagating wave passed through the additional phase modulator, and once when the backscatter passed through the additional modulator.

Thus, if the additional phase modulator introduces a phase shift of $\phi(t)$, the backscattered wave originating at any point except at the center of the loop 14 will have a phase shift of either zero, or $2\phi(t)$, either of which is time varying with respect to the $\phi(t)$ phase shift for the propagating wave. This time varying interference will average out over time, effectively eliminating the effects of the backscatter.

In yet another alternative method of prohibiting destructive or constructive interference from backscatter, the additional phase modulator, not synchronized with the modulator 38, may be introduced at the output of the light source 10.

In this case, backscatter occurring at any point other than the center of the loop 14 will have a different optical path length from the light source 10 to the detector 30 than does the propagating wave from which the backscatter originated.

Thus, the propagating wave will traverse the loop 14 one time, while the backscattered wave and the propagating wave from which it originated will have traversed a portion of the loop 14 twice. If this portion is not one-half of the loop, the path lengths differ.

Because the path lengths differ, a propagating wave which reaches the detector 30 will have been generated at the source 10 at a different time than a backscattered wave which reaches the detector 30 simultaneously.

The phase shift introduced by the additional phase modulator at the source 10 introduces a phase shift $\phi(t)$ relative to the propagating wave, but a phase shift of $\phi(t+K)$ to the backscattered wave, where K is the time difference between the passage of the waves through the modulator. Since $\phi(t+K)$ is time varying with respect to $\phi(t)$, the backscattered interference will average out over time, effectively eliminating the effects of the backscatter.

Open-Loop Extended Dynamic Range Detection System

The detection system described above with reference to FIGS. 1–9 is a very effective rotation sensing system within a certain range of rotational velocities for the loop 14. However, the dynamic range is limited by certain phenomena. For example, with reference to FIG. 9 it is seen that the sensitivity of the detection system can be reduced at very small rotation rates or when the rotation causes the central axis of curve 94 to be near points 95 or 97.

It can also be seen that the curve 80 is periodic. Therefore, if a large rotation rate causes a large enough $\Delta\phi_R$ to move the central axis of curve 94 past either the point 97 or the point 95, then the function 96 could repeat itself for a second, higher rotation rate. This second rotation rate would be substantially greater than the rotation rate which caused the Sagnac phse shift $\Delta\phi_R$ depicted in FIG. 9, but the output optical signal 96 could correspond to the one produced at the lower rotation rate. That is, if the $\Delta\phi_R$ from some larger rotational velocity were sufficiently large to move the curve 94 so as to operate between two new points 99' and 101' on the second lobe of the curve 80, then the output optical signal 96 could appear as it does for the case shown where the curve 94 operates between the points 99 and 101.

The present invention comprises a novel method, and associated open-loop apparatus, for extending the range in which the influence of external forces on interferometers, such as rotation of optical fiber gyroscopes, may be accurately and reliably sensed. The present invention additionally provides a phase of a low frequency signal which corresponds to the effects produced by external forces, such as rate of loop rotation, and which may be conveniently utilized for providing data to conventional digital output devices in order to quantify those effects, such as rotation rate.

Figure 10:
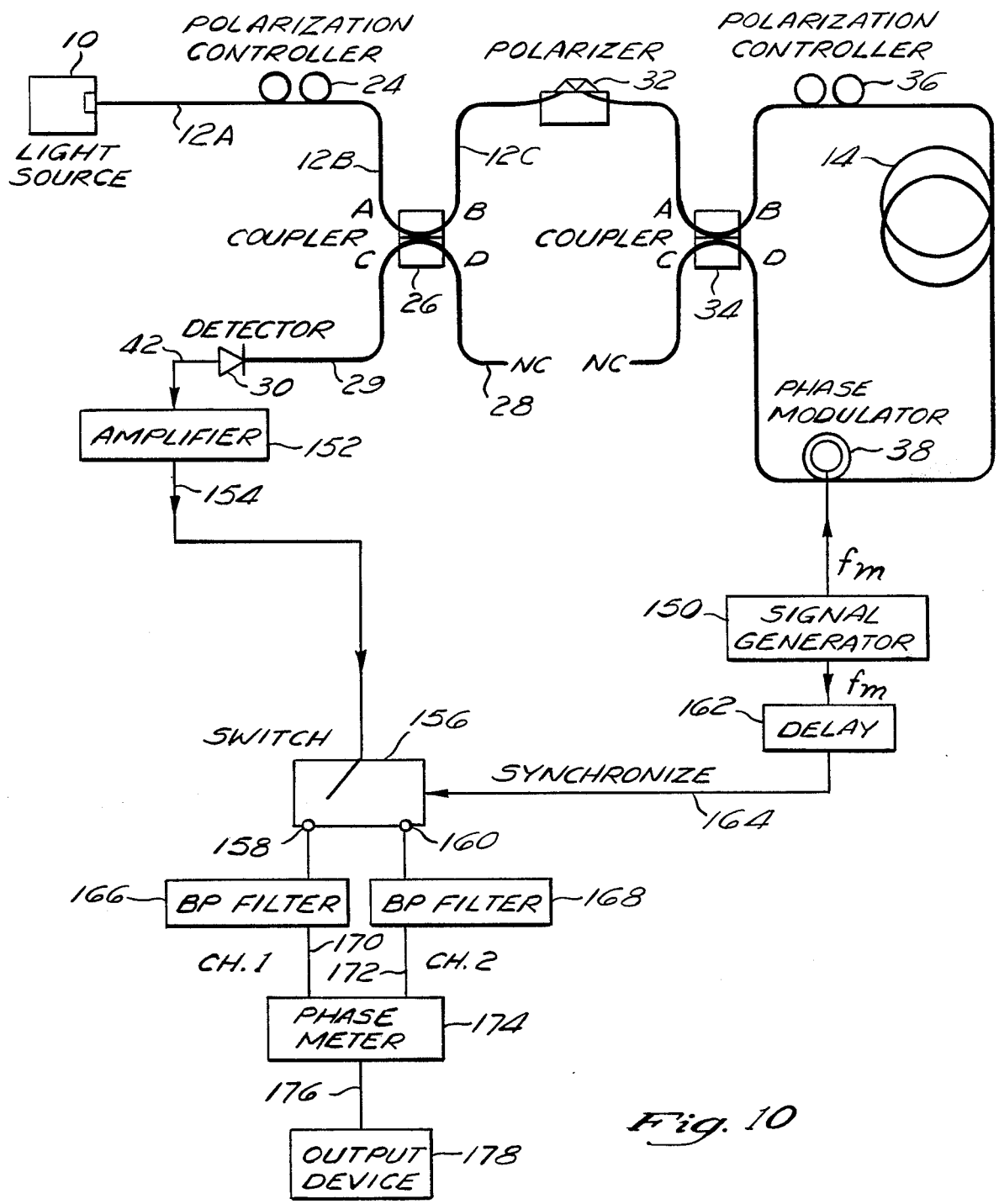
FIG. 10 is a diagram of one preferred embodiment of an open-loop phase reading rotation sensor with extended dynamic range.

One presently preferred embodiment of applicant's novel rotation sensor is illustrated in FIG. 10. It will be noted that the detection system of FIG. 10 includes an open-loop fiber optic sensor configuration. The detection system of FIG. 10 embodies many of the components of the system illustrated in FIG. 1. Thus, for purposes of simplicity, those components of FIGS. 1 and 10 which have the same structure and function have been assigned corresponding reference numbers.

It has been noted herein that the differential phase shift ($\Delta\phi_R$) is linearly proportional to the rotation rate. However, the intensity output from detector 30 is a nonlinear (periodic) function of the rotation rate.

Therefore, in order to obtain extended dynamic range on this open-loop system, it is necessary to recover the original optical phase information from the optical output signal of detector 30.

In the device of FIG. 10, the optical signal from the rotation loop is converted into an electrical output signal by detector 30. This electrical output signal contains components at the phase modulation frequency $f_m$ and its harmonics, as indicated by the following equation:

$$I(t) = C[1 + \cos(\Delta\phi_m \sin\omega_m t + \Delta\phi_R)] = \quad (11)$$

$$C\left[1 + \left(J_0(\Delta\phi_m) + 2\sum_{n=1}^{\infty} J_{2n}(\Delta\phi_m)\cos 2n\omega_m t\right)\cos(\Delta\phi_R) + \left(2\sum_{n=1}^{\infty} J_{2n-1}(\Delta\phi_m)\sin(2n-1)\omega_m t\right)\sin(\Delta\phi_R)\right]$$

Where C is a constant; $J_n$ denotes the n-th order Bessel function; $\Delta\phi_m$ is the amplitude of the phase difference between the counter-propagating waves produced by the modulation; and $\omega_m = 2\pi f_m$.

The present invention seeks to overcome many of the problems experienced in the art by providing an open-loop rotation sensor wherein the original optical phase information can be utilized to quickly and accurately provide a phase of a low frequency signal which is representative of $\Delta\phi_R$. This could be accomplished if the components of the output signal included two sinusoidal signals at the same frequency ($n\omega_m$) having amplitudes of cosine $\Delta\phi_R$ and sine $\Delta\phi_R$, respectively, with their phases in quadrature. In that situation, through use of well known trigonometric rules, these signals could be added directly to obtain a single, low frequency, sinusoidal signal whose phase corresponds to $\Delta\phi_R$. The present invention provides such a single sinusoidal signal through processing of the output signal from detector 30 as described below.

Figure 11:
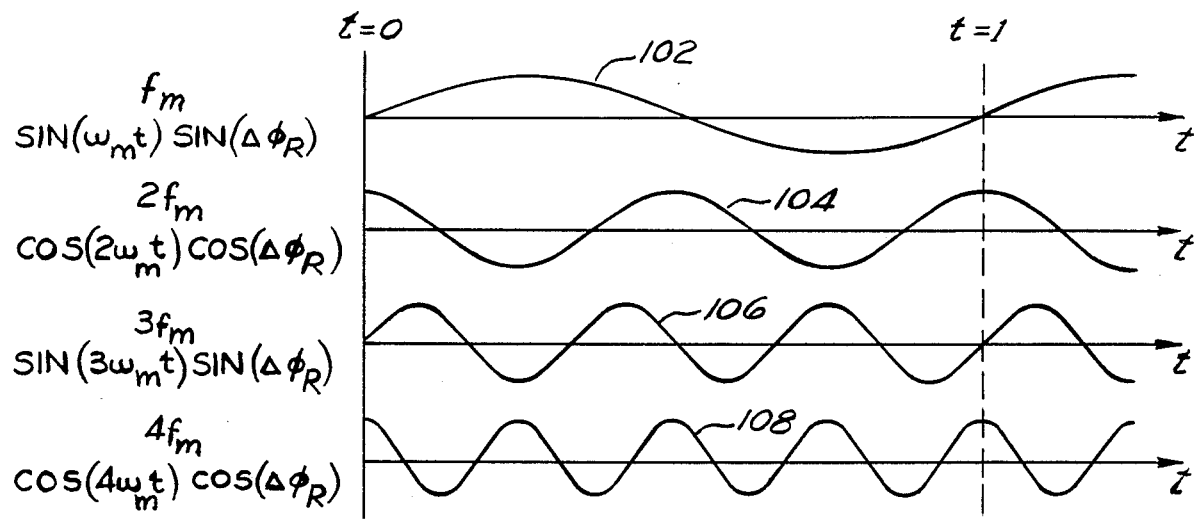
FIG. 11 is a diagram illustrating the first through fourth harmonic frequency components of the optical output signal from the fiber-optic loop associated with the rotation sensor.

Equation (11) indicates that the output from detector 30 contains terms of the above kinds, lacking only in that the cosine $\Delta\phi_R$ and sine $\Delta\phi_R$ terms are of different frequencies. FIG. 11 graphically illustrates this relationship as it exists between the first through fourth harmonic frequency components of the output signal from detector 30. Specifically, it is seen that the zero crossings of all odd harmonic frequency components (102,106) correspond to the zero crossings of the phase difference modulation signal 102, and that all even harmonic frequency components (104,108) are at their peak (90° out of phase with the phase modulation signal 102) at each zero crossing of the modulation signal. The waveforms of these harmonic components can be mathematically defined as follows:

$$\text{Odd harmonics} \sim (2n-1)\sin\omega_m t \sin\Delta\phi_R \quad (12)$$

$$\text{Even harmonics} \sim 2n \cos\omega_m t \cos\Delta\phi_R \quad (13)$$

where n=an integer value.

Since the various harmonics are at different frequencies, the above relationships cannot be directly utilized to obtain a single sinusoidal signal whose phase is $\Delta\phi_R$. However, if the above waveforms existed at the same frequency, then the desired single sinusoidal signal having a phase of $\Delta\phi_R$ could be produced by combining those sinusoidal signals as follows:

$$\sin n\omega_m t \sin\Delta\phi_R + \cos n\omega_m t \cos\Delta\phi_R = \cos(n\omega_m t - \Delta\phi_R) \quad (14)$$

The rotation sensor of FIG. 10 comprises one preferred embodiment of a rotation sensor which achieves the above waveshape relationship. Specifically, this relationship is achieved in the device of FIG. 10 through use of amplitude modulation. Amplitude modulation simply involves making the amplitude of the electrical output signal from detector 30 vary in accordance with the amplitude of a modulating signal.

When the output signal from detector 30 is amplitude modulated by a modulating signal having a frequency which is an odd multiple of the phase modulation frequency $f_m$ (which is also the difference frequency between adjacent harmonics), then each component of the output signal from detector 30 which is a harmonic of the $f_m$ frequency becomes partially translated into the frequencies of its harmonic neighbors. In other words, through amplitude modulation in this manner, sideband frequencies are created at harmonics of the phase modulation frequency. These sideband frequencies contain sinusoidal components which have been frequency shifted from harmonic amplitude modulated components of the output signal from detector 30. These sideband frequencies are combined with the component of the output sinnal at the corresponding frequency. Thus, components of the output signal from detector 30 which are harmonics of the $f_m$ frequency define waveforms of the type defined by equation (14). These and other characteristics of amplitude modulation are generally known to those skilled in the art and are described in detail in F. G. Stremler, *Introduction to Communication Systems*, (1979), which is incorporated herein by reference. Subject matter of particular relevance at this point is set forth on pages 191–260 of the Stremler text.

Based on the above, it will be appreciated that a sinusoidal amplitude modulation at the frequency $f_m$ will transfer energy out of each harmonic frequency component and into the nearest harmonic frequency neighbors. Further, each signal resulting from such an amplitude modulation will be in phase with its corresponding harmonic frequency component in the output signal from detector 30. The result of such amplitude modulation is that all harmonics then contain terms in both cosine $\Delta\phi_R$ and sine $\Delta\phi_R$ such that the n-th harmonic has a term cosine $(n\omega_m + \Delta\phi_R)$. Thus, the Sagnac optical phase shift $\Delta\phi_R$ has been isolated and transposed to a low frequency phase shift which can be measured directly by standard means.

One example of the use of the detection sensor illustrated in FIG. 10 for detecting the rotation rate over an extended dynamic range may be described by reference to FIG. 12 in conjunction with FIG. 10. Specifically, a signal generator 150 (FIG. 10) produces a phase difference modulation signal at frequency $f_m$ having a waveshape as illustrated at 200 in FIG. 12a, corresponding to sine $\Delta\phi_m t$.

Preferably, the phase modulation frequency $f_m$ corresponds to the "proper" frequency $f_p$ which was described previously with reference to equation (3). By phase modulating the counter-propagating waves at the proper frequency, the sensitivity of the rotation sensor is greatly improved. Of course, the sensor will also operate at frequencies other than $f_p$, but additional noise and reduced sensitivity will result, as was previously explained.

The phase modulation signal from generator 150 is applied to phase modulator 38, thereby phase modulating the counter-propagating light waves within the loop in the device described with reference to the device of FIG. 1. The resulting optical output signal on fiber 29 is detected by a detector 30, which produces an electronic output signal corresponding to the optical output signal. The electronic signal from detector 30 is amplified in a conventional AC amplifier 152 and transmitted via line 154 to the input of a conventional, double pole switch 156.

Switch 156 functions in response to a control signal received via line 164 from a conventional electronic signal delay circuit 162. In the preferred embodiment, the control signal is at the phase modulation frequency $f_m$. Circuit 162 is electrically connected to signal generator 150, so as to receive the control signal from that generator. Delay circuit 162 may be adjusted in order to synchronize the signal received from generator 150 to the phase of the signal received in switch 156 from line 154.

In response to the control signal from delay circuit 162, switch 156 transfers the signal from line 154 to one of two output ports 158 and 160 which define, respectively, the input ports of channels 1 and 2 of the detection system. This switching action functions to amplitude modulate the signals received from line 154 at the $f_m$ frequency of the synchronizing signal received via line 164 from delay 162. The square waveform of the amplitude modulation produced by switch 156 is graphically illustrated in FIG. 12(B) at 202 for channel 1, and at 204 for channel 2.

It will be appreciated that the square wave amplitude modulation provided in the device of FIG. 10 is only one of many waveforms which could be utilized for this amplitude modulation. The square wave modulation merely comprises an embodiment which is particularly simple to implement in the device of FIG. 10. In addition, it will be appreciated that amplitude modulation at frequencies other than $f_m$, or at odd harmonics of $f_m$ could be utilized.

However, due to the trigonometric relationships between the waveforms, amplitude modulation at even harmonics of $f_m$ would not produce coupling between adjacent harmonic frequencies. Rather, amplitude modulation at even harmonics of $f_m$ would result in the even harmonics coupling with even harmonics, and odd harmonics coupling with odd harmonics. This situation is generally understood by those skilled in the art, and the basis for this condition may be more fully understood by reference to the Stremler text, which has been incorporated herein. These problems are avoided if amplitude modulation at the odd harmonics is utilized.

Referring to FIG. 12(C) it is noted that when the loop is not rotating, the square wave amplitude modulation produced by switch 156 provides an output signal 206 in channel 1 which is 180° out of phase with respect to the output signal 208 in channel 2. By amplitude modulating the signal on line 154 to produce signals which are 180° out of phase, the sine and cosine relationships of the components may be readily evaluated.

From the output 158 of switch 156, the modulated signal in channel 1 passes through a band pass filter 166 which is tuned to select one harmonic component ($n\omega_m$) of the signal in channel 1 (wherein n = the selected harmonic). Likewise, the signal from the output 160 of switch 156 is transmitted to a band pass filter 168 which is tuned to select a component of the signal in channel 2 at the corresponding harmonic frequency. The filtered signals transmitted from filters 166 and 168 may be mathematically described as follows:

Channel 1: (15)
$I_1 = K_1\cos(\Delta\phi_R)\cos(n\omega_m t) + K_2\sin(\Delta\phi_R)\sin(n\omega_m t)$
Channel 2:
$I_2 = K_3\cos(\Delta\phi_R)\cos(n\omega_m t) + K_4\sin(\Delta\phi_R)\sin(n\omega_m t)$ where $K_1$ through $K_4$ are constants determined by $\Delta\phi_m$ and n.

In the example illustrated in FIG. 12, the second harmonic of the $f_m$ frequency was chosen in order to avoid noise produced by the electronics, as well as to preclude spurious signals which may be produced by the switch at the $f_m$ frequency. Of course, it will be appreciated that other harmonics of $f_m$ could also be selected, based upon the frequency range desired and the characteristics of the switch and the electronic components.

At the second harmonic frequency, the constants $K_1$ through $K_4$ may be described as follows:

$$K_1 = K_3 \approx J_2(\Delta\phi_m) \quad (16)$$

$$K_2 = -K_4 \approx (8/\pi) \sum_{n=1}^{\infty} (-1)^n J_{2n-1}(\Delta\phi_m)/(2n-3)(2n+1)$$

If $K_1 = K_2 = K$, the equation 15 becomes:

$$I_1 = K\cos(2\omega_m t - \Delta\phi_R)$$

$$I_2 = K\cos(2\omega_m t + \Delta\phi_R) \quad (17)$$

Those skilled in the art will recognize that the evaluation of the coefficients $K_1$-$K_4$ depends upon several factors including, for example, the amplitude of phase modulation applied to the phase modulator, the waveform of the amplitude modulation, the frequency of switching in switch 156, and the frequency to which the band pass filters 166 and 168 are tuned. Given this information, one skilled in the art can determine the values of $K_1$-$K_4$ by conventional mathematical means, as generally set forth in numerous reference sources such as the Stremler text cited above.

The relationship of Equation (17) may be obtained without use of mathematics by actual adjustment of elements of the rotation sensor. For example, one may select the frequency of the switch, the frequency to which the band pass filters are tuned, and the waveform of the amplitude modulation. The values of $K_1$ and $K_2$ in Equation (17) can then be made to equal each other by merely adjusting the amplitude of the phase modulation signal which is applied to modulator 38. In tuning the system to a condition where $K_1 = K_2$, the amplitude of the phase modulation signal is repeatedly adjusted, and the loop is rotated, until the amplitude of the signal from the band pass filters does not change as a result of the rotation. Referring again to FIG. 12(C), the 2nd harmonic output waveform from band pass filter 166 in channel 1 is illustrated at 210. Likewise, the 2nd harmonic waveform from output band pass filter 168 in channel 2 is illustrated at 212. The signals (210, 212) on lines 170 and 172 of FIG. 10 are transmitted into a phase meter 174, which may comprise a conventional time interval counter, such as a Model No. 5345A, manufactured by Hewlett-Packard. In this phase meter 174, the time interval counter is activated as the waveform 210 of FIG. 12(C) crosses zero, and continues to count until the waveform 212 crosses zero. The total count identifies the phase difference between waveforms 210 and 212 which corresponds to two times the phase difference $\Delta\phi_R$. Of course, this phase difference is representative of the amount of rotation experienced by the optical loop. Therefore, the phase difference measurement produced by phase meter 174 is representative of the rotation rate of the loop.

The waveforms in FIG. 12(C) are produced when no rotation is experienced by the optical loop. Under those conditions, the waveforms 210 and 212 are in phase, and the phase meter 174 would therefore detect no phase difference between those waveforms. This situation is illustrated in FIG. 12(C) at 214 where it is seen that the value of $\Delta\phi_R$ is zero. Thus, in this situation, the output from phase meter 174 would also be zero. This signal from meter 174 is then passed onto line 176 from whence it may be utilized by any conventional output device 178 such as a digital computer, for communicating the rotation rate of the loop.

Typically, the output device 178 would be capable of maintaining a record of the most recently measured rotation rate so that information as to present changes in the rotation rate from phase meter 174 would be utilized to update the rotation rate record of output device 178. Thus, if the operating range of the system was such that the zero crossing of signal 212 extended beyond one period from the zero crossing of the waveform 210, the digital output device would determine the rotation rate at this extended dynamic range, even though the output from the phase meter 174 by itself would not be able to reflect that this measurement was made beyond the first period of the waveform.

Referring now to FIG. 12(D), the condition experienced in the rotation sensor of FIG. 10 as a result of loop rotation in the amount of 40° per second is illustrated. Again, the phase modulation signal is applied at frequency $f_m$ as indicated at 200, and the output signal from detector 30 is amplitude modulated in switch 156 with a square wave signal 202, 204 at a frequency $f_m$. The output signal in channel 1 from switch 156 is illustrated at 216 of FIG. 12(D), while the output from switch 156 in channel 2 is illustrated at 218. The corresponding band pass filter output for channel 1 is illustrated at 220, while the output for channel 2 is illustrated at 222.

As a result of the rotation, phase meter 174 will detect a phase difference between the waveform 220 of channel 1 and the waveform 222 of channel 2. This phase difference is indicated at 224 of FIG. 12(D), and is proportional to two times the phase difference $\Delta\phi_R$ produced by rotation of the optical loop.

Figure 13:
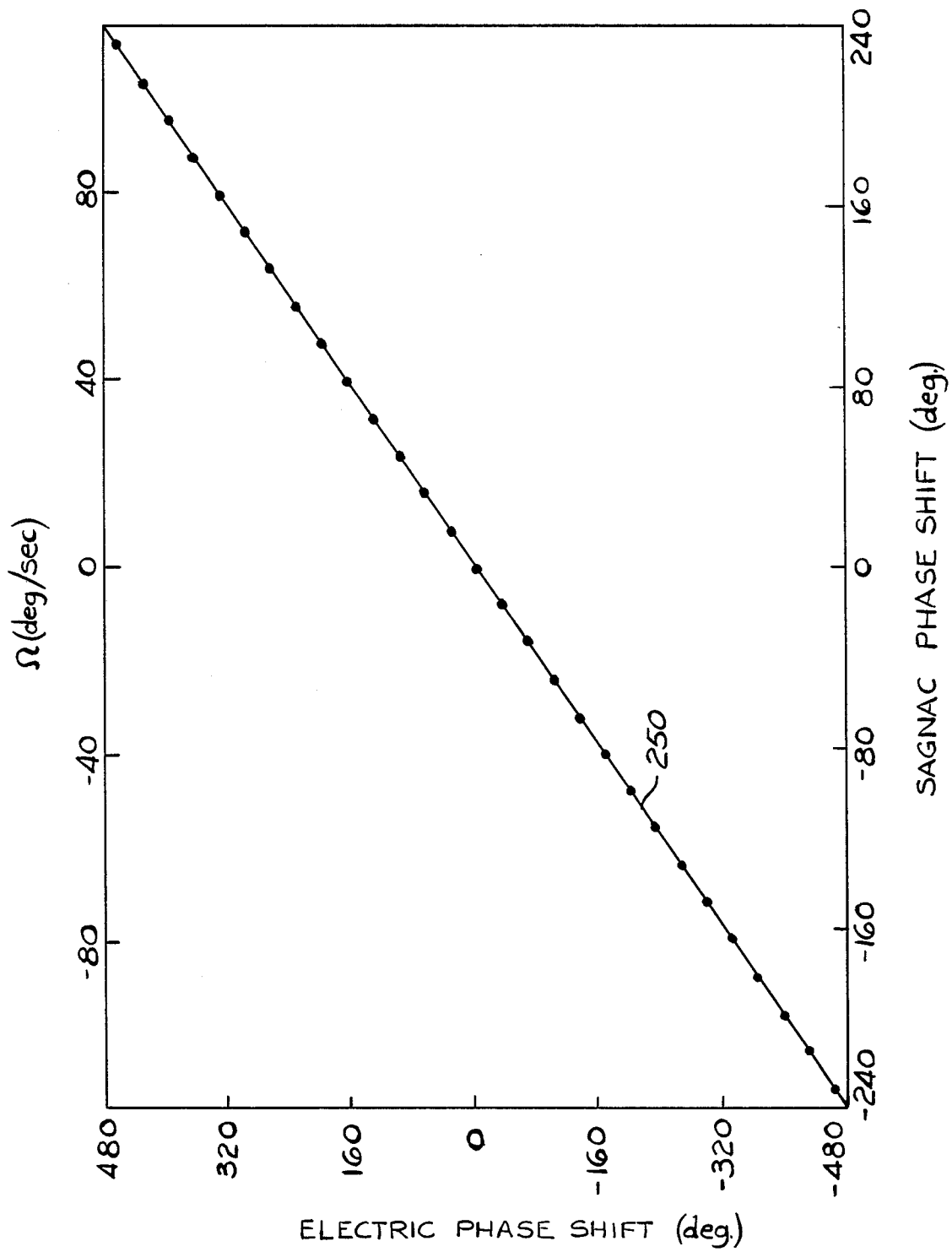
FIG. 13 is a graph illustrating the linear scale factor of the rotation sensor illustrated in FIG. 10.

Referring now to FIG. 13, graph line 250 illustrates the phase shift detected by phase meter 174 between the channel 1 and channel 2 filter output signals as compared to the actual Sagnac phase shift. It is noted that a substantially linear result is achieved over a very wide dynamic range. The dots along line 250 identify plots from particular experimental measurements which were made.

From the above, it is seen that the simple, open-loop rotation sensor of FIG. 10 comprises a device which implements an important technique for utilizing an open-loop rotation sensor to achieve extended dynamic sensing of fiber optic gyroscope rotation. The device accomplishes this accurately, with a high degree of sensitivity, and without use of extensive electronic components or other devices which have been necessary in other types of rotation sensors.

Figure 14:
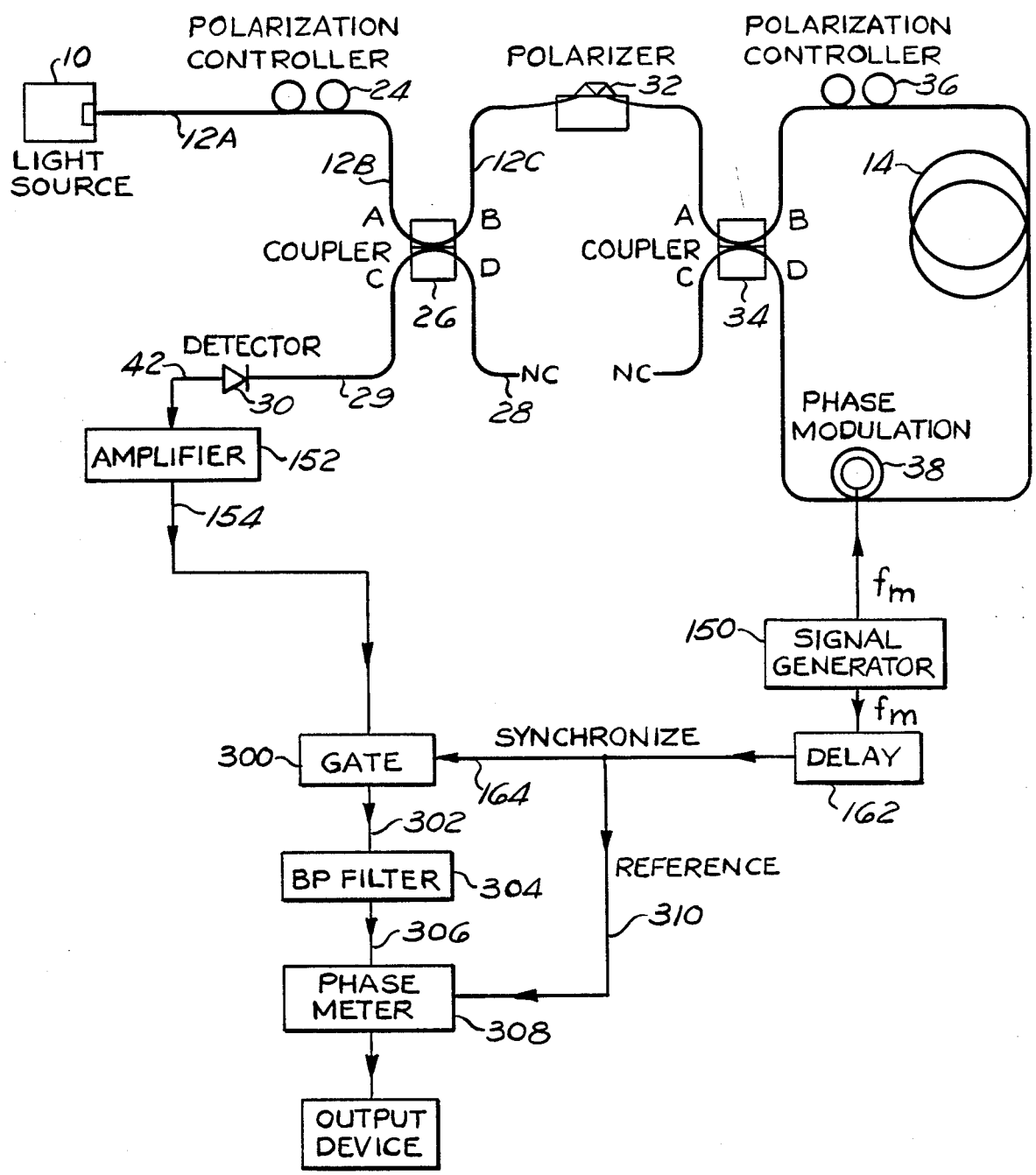
FIG. 14 is a diagram of another preferred embodiment of an open-loop, phase reading rotation sensor with extended dynamic range.

Another preferred embodiment of the rotation sensor of the present invention is illustrated in FIG. 14. In this embodiment, switch 156 of FIG. 10 is replaced by a conventional electronic gate 300. Gate 300 functions in response to a signal received on line 164 from a delay circuit 162 in the manner previously described with respect to the embodiment of FIG. 10. Thus, gate 300 produces square wave amplitude modulation of a signal received from amplifier 152 in accordance with the device illustrated in FIG. 10. When modulated at the appropriate phase and amplitude with respect to frequency $f_m$, the amplitude modulated signal of this embodiment is defined by the equation $\cos(n\omega_m t - \Delta\phi_R)$. This corresponds with the definition in equation (17) for $I_1$ of channel 1 of the embodiment of FIG. 10.

From gate 300, the amplitude modulated signal is transmitted via line 302 to a band pass filter 304 which is tuned to a selected harmonic of the phase modulation frequency $f_m$. For reasons discussed below, in the specific embodiment illustrated in FIG. 14, the frequency selected should be the first harmonic, corresponding to the $f_m$ frequency. The filtered signal is then transmitted via line 306 to a phase meter 308, which corresponds in function to meter 174 in the embodiment of FIG. 10. The signal from line 306 is compared with a reference signal received via line 310 from delay circuit 162 at frequency $f_m$. The signal on line 310 corresponds to the phase difference modulation signal as delayed in circuit 162, which is defined by the term $\cos \omega_m t$. The resulting output from the phase meter 308 corresponds to the phase difference signal $\Delta\phi_R$ produced by rotation of the optical loop.

If it is desired to select a harmonic other than the first in band pass filter 304, the device of FIG. 14 may be modified by including a frequency multiplier (not shown) in line 310, so that the selected harmonic of the $f_m$ phase modulation signal can be applied to the appropriate input of phase meter 308. As with the output from phase meter 174 of the embodiment of FIG. 10, the output of phase meter 308 can be utilized by conventional digital devices for indicating the rotation rate of the optical loop.

Referring to FIG. 15, operation of the device of FIG. 14 may be graphically described. Specifically, when a phase modulation signal is applied from signal generator 150 to phase modulator 38 at frequency $f_m$, the resulting phase difference modulation waveform at frequency $f_m$ is illustrated at 350. At this frequency, gate 300 provides square wave amplitude modulation in accordance with the waveform illustrated at 352.

FIG. 15(B) illustrates the waveshapes produced when the optical loop is not rotated. Specifically, when no rotation is experienced in the loop, the waveshape of the output signal of detector 30 is illustrated at 354. The amplitude modulated output signal at frequency $f_m$ produced by gate 300 is illustrated at 356, with the resulting output of band pass filter 304 at frequency $f_m$ illustrated at 358. Under these conditions, the phase meter 308 will detect the time interval between zero crossing of the waveshape 358 and the leading edge of the reference signal 352. Since like sinusoidal terms cancel in this condition, the phase meter 308 indicates that the rotation rate is zero. This situation is graphically illustrated at 360 in FIG. 15(B).

FIG. 15(C) illustrates the situation which exists in the device of FIG. 14 during rotation of the optical loop. In this condition, with phase modulation at frequency $f_m$ and gated amplitude modulation at frequency $f_m$, the output of detector 30 is illustrated at 362. Accordingly, the amplitude modulated signal from gate 300 is illustrated at 364. The corresponding waveshape as seen on the output of band pass filter 304 at frequency $f_m$ is illustrated at 366. In this situation, it is noted that the zero crossing of waveshape 366 is offset from the corresponding leading edge of the reference signal 352. Accordingly, this offset is detected in phase meter 308 and an output signal is produced corresponding to the phase difference signal produced in the counter-propagating waves by the rotation of the optical loop. The amount of this phase shift, corresponding to the $\Delta \phi_R$, is illstrated at 368 of FIG. 15(C).

Optionally, gating of the device of either of FIGS. 10 or 14 could be accomplished optically rather than electrically by utilizing at least one optical gate, such as a shutter, positioned at any desired location on the optical loop prior to photodetector 30. For example, the optical gate could be positioned at the input of the light source, between the first directional coupler and the laser diode. In such a configuration, the gate would continue to be controlled by a delay signal at a frequency $f_m$ so that the light traveling within the loop would be amplitude modulated at the $f_m$ frequency. In all other respects, the use of optical gating would provide a result substantially identical to that described with respect to the device of FIGS. 10 or 14.

In summary, not only does the invention described herein comprise a significant improvement over the prior art in detecting rotation rates of optical gyroscopes, but it also overcomes other long-existing problems in the art by (1) providing an open-loop sensor having a substantially unlimited dynamic range; (2) providing such a sensor which is compatible with conventional electronic and fiber optic devices; (3) providing a system which is simple in construction, and does not require the complex electronic feedback systems or other control devices which are commonly utilized in other types of interferometers; and (4) provides very accurate results which are directly useable by digital devices. In addition to overcoming these problems, devices of the type described herein are very inexpensive to produce as compared to the other sensing devices currently on the market, and thus the invention provides great economic savings in conjunction with its use in commercial applications. Because of its simplicity and extended dynamic range, as well as its minimal space requirements, the device and method described herein finds application in many and varied uses, and can be easily incorporated into many different types of embodiments.

Although the present invention has been described with reference to a Sagnac interferometer, it will be appreciated that the detection system of the present invention is equally applicable for all other types of interferometers, such as Mach-Zehnder interferometers, Michelson interferometers, and Fabray-Perot interferometers. All of the above-identified interferometers are well-known in the art and provide an interferometer output signal comprised of two interfering light waves, wherein the phase difference between the light waves determines the intensity of the output signal. Further, the invention is applicable for the type of fiber optic interferometer disclosed in copending U.S. patent application Ser. No. 426,890 filed Sept. 29, 1982 and entitled "Fiber Optic Resonator", which is analogous to a Fabray-Perot interferometer. This application is incorporated by reference herein.

It will be appreciated that the phase of only one light wave may be influenced by external forces in some of the interferometers with which the invention can be used. In those interferometers the resultant phase shift detected by the invention may be different than the shift detected in the Sagnac interferometer described herein. In that case, one skilled in the art will recognize that the scale factor used in processing the output signal will need to be adjusted accordingly, in order to properly determine the response of the interferometer to the external forces. In all other respects, the phase reading detection device of the present invention functions as has been described herein.

It will also be appreciated that, while the invention has been described in terms of a fiber optic interferometer, it is equally applicable to interferometers using bulk optic components, such as beam splitters and/or mirrors. Those skilled in the art will understand that, if optical fibers are not used to guide the interfering waves, modulation of the waves may be accomplished by other means, such as mirrors or electro-optical devices.

While the preferred embodiment was described in a rotation sensing context, the invention is equally applicable to any interferometer application which produces a phase difference between two light waves. The present invention is capable of detecting such phase difference regardless of the particular quantity or phenomenon which produces the phase difference. Thus, the invention is appropriate for use with any type of interferometer, regardless of the structural aspects of the interferometer, the components used to construct such interferometer, or the quantity which produces the detected phase difference between the two interfering waves of the interferometer.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States letters patent is:

1. In a method of detecting shifts in phase difference of interfering light waves which propagate within an interferometer formed of optical fiber, and the interferometer being of the type which produces an optical output signal comprised of the interferring light waves, wherein the phase difference between the interfering light waves is dependent upon the respective optical path lengths traveled by the light waves within the interferometer and upon the influence of external forces applied to the interferometer, and wherein the intensity of the optical output signal is dependent upon the phase difference of the interfering light waves, the improvement comprising the steps of:

combining the interfering light waves to form an output having a waveform which corresponds to the phase difference of said light waves;

passing the output through an amplitude modulator to mix the output waveform with a modulating waveform which is at a modulation frequency; and selecting a predetermined frequency from the amplitude modulated output to produce a signal which is representative of shifts in said phase difference, wherein said predetermined frequency is a harmonic of the modulation frequency.

2. A method of detecting shifts in phase difference of interfering light waves as defined in claim 1, wherein the step passing the output through an amplitude modulator comprises the step of amplitude modulating the output to provide a low frequency signal having a phase shift which corresponds to the shift in the phase difference of the interfering light waves.

3. A method of detecting shifts in phase difference of interfering light waves as defined in claim 1, wherein the method further comprises the step of phase modulating the interfering light waves at the modulation frequency; and wherein the step of passing the output through an amplitude modulator comprises the step of mixing the output waveform with the modulating waveform at the modulation frequency to produce a signal having harmonics of said modulation frequency which contain both cosine and sine components of the output.

4. A method of detecting shifts in phase difference of interfering light waves as defined in claim 3 wherein the step of selecting a predetermined frequency comprises the step of detecting a component of the amplitude modulated output which is at a harmonic of the modulation frequency; and wherein the method further comprises the step of comparing the detected component with a reference signal to produce as signal representative of shifts in said phase difference.

5. A method of detecting shifts in phase difference of interfering light waves as defined in claim 1 wherein the shifts in the phase difference of the interfering waves are caused by external forces applied to the interferometer and wherein the method further comprises the step of measuring the signal representative of shifts in the phase difference to determine the response of the interfermeter to the external forces.

6. A method of deecting shifts in phase difference as defined in claim 1, further comprising the step of passing components of the signal at said selected frequency from the amplitude modulator through a comparator to produce a signal which is proportional to shifts in said phase difference caused by influence of external forces upon the interferometer.

7. In a method of detecting shifts in phase difference of interfering light waves which propagate within an interferometer of the type which provides for production of an optical output signal comprised of the interfering light waves, wherein the phase difference between the interfering light waves is dependent upon the respective optical path lengths traveled by the light waves within the interferometer and upon the influence of external forces applied to the interferometer, and wherein the intensity of the optical output signal is dependent upon the phase difference of the interfering light waves, the improvement comprising the steps of:
phase modulating the interfering light waves at a modulation frequency;
combining the interfering light waves to form an output having a waveform which corresponds to the phase difference of said light waves;
mixing the output waveform with a modulating waveform at the modulation frequency to produce a modulated output having harmonics of said modulation frequency which contain both cosine and sine components of the output;
alternately placing the modulated output on one of two channels at the selected frequency, so as to define amplitude modulated signals in the channels which are substantially 180° out of phase with each other; and
detecting selected components of the modulated signals in each channel to produce signals whose phase difference corresponds to the shift in phase difference of the interfering light waves.

8. A method of detecting shifts in phase difference of interfering light waves as defined in claim 7, further comprising the steps of:
comparing the detected components from each channel to identify their phase difference; and
providing a signal which corresponds to the phase difference of the detected components, and which is representative of the shifts in phase difference of interfering light waves.

9. In an inteferometer formed of optical fiber, and the interferometer being of the type which produces an optical output signal comprised of interfering light waves which propagate within the interferometer, wherein the phase difference between the interfering waves is dependent upon the respective optical path lengths traveled by the light waves within the interferometer and upon the influence of external forces applied to the interferometer, and wherein the intensity of the optical output signal is dependent upon the phase difference of the interfering light waves, an apparatus for detecting shifts in phase difference of the interfering light waves comprising:
means for combining the interfering light waves to form an output having a waveform which corresponds to the phase difference of said light waves;
means for mixing the output from the combining means with a modulating waveform which is at a modulation frequency to provide an amplitude modulated output; and
means for selectign a predetermined frequency from the amplitude modulated signal to produce a signal which is representative of shifts in said phase difference, and wherein said predetermined frequency is a harmonic of the modulation frequency.

10. An apparatus for detecting shifts in phase difference as defined in claim 9 further comprising:
a signal generator for providing a phase modulation signal at a selected modulation frequency;
a phase modulator, responsive to the signal generator for phase modulating the interfering light waves in the interferometer at the selected modulation frequency; and
wherein the means for mixing functions to amplitude modulate the output at the selected modulation frequency.

11. An apparatus for detecting shifts in phase difference as defined in claim 10, wherein the means for selecting comprises a device for detecting a component of the amplitude modulated output which is at a harmonic of the selected modulation frequency; and wherein the apparatus further comprises a device for comparing the detected component with a reference signal to produce a signal which corresponds to the phase difference between the detected component and the reference signal, and which is proportional to the shifts in phase difference of the interfering light waves.

12. An apparatus for detecting shifts in phase difference as defined in claim 9 wherein the shifts in the phase difference of the interfering waves are caused by external forces applied to the interferometer and wherein the signal which is representative of shifts in the phase difference provides an indication of the response of the interferometer to the external forces.

13. In an interferometer of the type which provides for production of an optical output signal comprised of interfering light waves which propagate within the interferometer, wherein the phase difference between the interfering waves is dependent upon the respective optical path lengths traveled by the light waves within the interferometer and upon the influence of external forces applied to the interferometer, and wherein the intensity of the optical output signal is dependent upon the phase difference of the interfering light waves, an apparatus for detecting shifts in phase difference of the interfering light waves comprising:
  means for combining the interfering light waves to form an output having a waveform which corresponds to the phase difference of said light waves;
  a first device for alternately placing the amplitude modulated output signal on one of two device outputs at a modulation frequency, so as to define amplitude modulated signals on the outputs which are substantially 180° out of phase with each other; and
  means for selecting a predetermined frequency from the amplitude modulated signal to produce a signal which is representative of shifts in said phase difference.

14. An apparatus for detecting shifts in phase difference as defined in claim 11 wherein the means for selecting comprises:
  at least one second device for detecting selected components of the amplitude modulated signals on each of the first device outputs, and for providing signals representative of the selected components, wherein the phase difference of the representative signals corresponds to the phase difference caused by application fo the external forces to the interferometer; and
  a third device for comparing the signals representative of the selected components and providing an output signal which corresponds to the phase difference of said representative signals, said output signal being proportional to the shifts in phase difference of the interfering light waves.

15. A method of detecting the rotation rate of an optical loop formed of optical fibers having counter-propagating light waves therein whose phase difference is shifted by the rotation rate of the optical loop, comprising the steps of:
  phase modulating the counter-propagating waves at a selected frequency;
  combining the counter-propagating waves to produce an output signal;
  passing the output signal through an amplitude modulator to mix the output signal with a modulating waveform substantially at the selected frequency to transpose the shift in the phase difference into a phase shift in a low frequency signal;
  monitoring a selected component of the low frequency signal to identify shifts in the counter-propagating wave phase difference caused by rotation, wherein said selected component is a harmonic of the selected frequency; and
  providing an output signal proportional to the rotation rate of the optical loop.

16. A method of detecting the rotation rate of an optical loop as defined in claim 15, wherein the step of passing the output signal through an amplitude modulator comprises the step of amplitude modulating the output signal to produce a signal having harmonics of the selected frequency which contain both cosine and sine components of the output signal.

17. A method of detecting rotation rate of an optical loop having counter-propagating light waves therein whose phase difference is shifted by the rotation rate of the optical loop, comprising the steps of:
  phase modulating the counter-propagating waves at a selected frequency;
  combining the counter-propagating waves to produce an output signal;
  alternately transmitting the output signal to one, and then the other, of two outputs on a switch such that the signals on said switch outputs are out of phase with each other;
  filtering the signals from the switch outputs so as to provide filtered signals comprising selected components which are substantially harmonics of said signals from the switch outputs, said filtered signals comprising amplitude modulated signals at the frequencies of the selected components, and wherein the combined, filtered signals comprise a phase shift in a low frequency signal;
  monitoring selected components of the low frequency signal to identify shifts in the counter-propagating wave phase difference caused by rotation; and
  providing an output signal proportional to the rotation rate of the optical loop.

18. A method of detecting the rotation rate of an optical loop as defined in claim 17, wherein the steps of monitoring selected components of the low frequency signal and providing an output signal comprise the steps of:
  comparing the phases of the filtered signals; and
  providing an output signal which corresponds to the phase difference of the filtered signals and which is proportional to the rotation rate of the optical loop.

19. A method of detecting the rotation rate of an optical loop as defined in claim 17, wherein the step of alternately transmitting the output signal comprises the step of square wave modulating the output signal.

20. A method of detecting the rotation rate of an optical loop as defined in claim 12, wherein the signals on the switch outputs are substantially 180° out of phase with each other.

21. A method of detecting rotation rate of an optical loop having counter-propagating light waves therein whose phase difference is shifted by the rotation rate of the optical loop, comprising the steps of:
  phase modulating the counter-propagating waves at a selected frequency;
  combining the counter-propagating waves to produce an output signal;
  gating a portion of the output signal onto a gate output so as to provide an amplitude modulated signal on the gate output;
  filtering the signal from the gate output so as to provide a filtered signal comprising a selected harmonic component of the signal from the gate output, said filtered signal thus ocmprising an amplitude modulated signal at the frequency of the harmonic component, said filtered signal having a phase shift corresponding to that of the phase difference caused by loop rotation;

monitoring selected components of the low frequency signal to indentify shifts in the counter-propagating wave phase difference caused by rotation; and providing an output signal proportional to the rotation rate of the optical loop.

22. A method of detecting the rotation rate of an optical loop as defined in claim 21, wherein the steps of monitoring selected components of the low frequency signal and providing an output signal comprise the steps of:

comparing the filtered signal with a reference signal at substantially a harmonic of the first selected frequency; and providing an output signal which corresponds to the phase difference between the filtered signal and the reference signal, and which is proportional to the rotation rate of the optical loop.

23. An apparatus for detecting rotation rate of any optical loop formed of optical fibers wherein light waves may be counter-propagated, the phase difference of the light waves being shifted in response to rotation of the optical loop and the light waves being combined to form an optical output signal, the apparatus comprising:

a signal source for providing a phase modulation signal at a first selected frequency;

a phase modulator responsive to the modulation signal for phase modulating the counter-propagating waves at the first selected frequency;

a detector for sensing the optical output signal and for providing a corresponding electrical output signal;

an amplitude modulator circuit electrically connected to the output of the detector and responsive to the signal generator for mixing the output signal waveform with a modulating waveform to provide an amplitude modulated output signal at a second selected frequency which is a harmonic of the first selected frequency; and a phase sensitive device for monitoring the phase of the amplitude modulated output signal at the second selected frequency in order to detect the phase shift in said output signal caused by rotation of the optical loop.

24. An apparatus for detecting rotation rate of an optical loop as defined in claim 23, further comprising means for substantially removing any direct current component from the electrical output signal, thereby providing a substantially alternating current signal to the amplitude modulator circuit.

25. An apparatus for detecting rotation rate of an optical loop wherein light waves may be counter-propagated, the phase difference of the light waves being shifted in response to rotation of the optical loop and the light waves being combined to form an optical output signal, the apparatus comprising:

a signal source for providing a phase modulation signal at a first selected frequency;

a phase modulator responsive to the modulation signal for phase modulating the counter-propagating waves at the first selected frequency;

a detector for sensing the optical output signal and for providing a corresponding electrical output signal;

a switch which alternately transmits the electrical output signal to one and then the other of two outputs on the switch such that the signals on the switch outputs are out of phase with each other;

at least one filter responsive to the signals from the outputs of the switch for detecting selected harmonic components of the switch output signals and providing filtered signals corresponding to the selected components, said filtered signals comprising an amplitude modulated output signal at a second selected frequency; and a phase sensitive device for monitoring the phase of the amplitude modulated output signal at the second selected frequency in order to detect the phase shift in said output signal caused by rotation of the optical loop.

26. An apparatus for detecting rotation rate of an optical loop as defined in claim 25, wherein the phase sensitive device comprises a phase detector for comparing the phases of the filtered signals, and for providing an output signal which corresponds to the phase difference of the filtered signals and is proportional to the rotation rate of the optical loop.

27. An apparatus for detecting rotation rate of an optical loop as defined in claim 25, wherein the signals on the switch output are substantially 180° out of phase with each other.

28. An apparatus for detecting rotation rate of an optical loop as defined in claim 25, wherein the switch functions to provide square wave amplitude modulation of the electrical output signal.

29. An apparatus for detecting rotation rate of an optical loop wherein light waves may be counter-propagated, the phase difference of the light waves being shifted in response to rotation of the optical loop and the light waves being combined to form an optical output signal, the apparatus comprising:

a signal source for providing a phase modulation signal at a first selected frequency;

a phase modulator responsive to the modulation signal for phase modulating the counter-propagating waves at the first selected frequency;

a detector for sensing the optical output signal and for providing a corresponding electrical output signal;

a gate which functions to mix the output signal waveform with a modulating waveform and to thereby pass a portion of an amplitude modulated to a gate output;

a filter, responsive to the amplitude modulated signal for detecting selected harmonic components of said signal, so as to provide a filtered signal whose phase shift corresponds to the phase shift produced in the counter-propagating waves by the rotation rate; and a phase sensitive device for monitoring the phase of the filtered signal in order to detect the phase shift in said output signal caused by rotation of the optical loop.

30. An apparatus for detecting rotation rate of an optical loop as defined in claim 29, wherein the phase sensitive device compares the phase of the filtered signal with a reference signal at the frequency of the selected harmonic components, and wherein the phase sensitive device provides an output signal which corresponds to the phase difference between the filtered signal and the reference signal, and which is proportional to the rotation rate of the optical loop.

31. In a method of detecting the effect of external forces on an interferometer of the type formed of optical fiber and which provides for production of an optical output signal comprised of interfering light waves which propagate within the interferometer, wherein the phase difference between the interfering light waves is dependent upon the respective optical path lengths traveled by the light waves within the interferometer and upon the influence of external forces applied to the interferometer and wherein the intensity of the optical output signal is dependent upon the phase difference of the interfering light waves, the improvement comprising the steps of:

combining the interfering light waves to form an output having a waveform which corresponds to the phase difference of said light waves;

mixing the output waveform with a modulating waveform at a modulation frequency to provide a low frequency signal which is at a harmonic of the modulation frequency, and whose phase shift corresponds to the shift in said phase difference of the light waves, which shift is induced by external forces applied to the interferometer;

monitoring selected components of the low frequency signal to identify said phase shift of the low frequency signal; and providing an output signal corresponding to the phase shift of the low frequency signal and representative of the response of the interferometer to the external forces.

32. A method of detecting the effect of external forces on an interferometer as defined in claim 31, wherein the step of mixing the output waveform comprises the steps of:

phase modulating the interfering light waves at a selected frequency; and passing the output through an amplitude modulator at the selected frequency to produce a signal having harmonics of the selected frequency which contain both cosine and sine components of the output.

33. A method of detecting the effect of external forces on an interferometer as defined in claim 32, wherein the step of providing an output signal comprises the steps of:

detecting a component of the amplitude modulated output which is at a harmonic of the selected frequency; and comparing the detected component to a reference signal to produce a signal corresponding to the phase shift of the detected component, and representative of the response of the interferometer to the external forces.

34. In a method of detecting the effect of external forces on an interferometer of the type which provides for production of an optical output signal comprised of interfering light waves which propagate within the interferometer, wherein the phase difference between the interfering light waves is dependent upon the respective optical path lengths traveled by the light waves within the interferometer and upon the influence of external forces applied to the interferometer and wherein the intensity of the optical output signal is dependent upon the phase difference of the interfering light waves, the improvement comprising the steps of:

phase modulating the interfering light waves at a selected frequency;

combining the interfering light waves to form an output having a waveform which corresponds to the phase difference of said light waves;

alternately placing the output on one of two channels at the selected frequency, so as to define amplitude modulated signals in the channels which are substantially 180° out of phase with each other;

detecting selected components of the modulated signals in each channel to produce signals whose phase difference corresponds to the phase difference caused by application of the external forces to the interferometer; and providing an output signal corresponding to the phase difference of the selected components and representative of the response of the interferometer to the external forces.

35. A method of detecting the effect of external forces on an interferometer as defined in claim 34, wherein the step of providing an output signal comprises the steps of:

comparing the detected components from each channel to identify their phase difference; and providing a signal corresponding to the phase difference of the detected components, and representative of the response of the interferometer to the external forces.

36. A method of detecting rotation rate of an optical loop formed of optical fiber having counter-propagating light waves therein whose phase difference is shifted by the rotation rate of the optical loop, comprising the steps of:

combining the counter-propagating light waves to form an output having a waveform which corresponds to the phase difference of said light waves;

passing the output through an amplitude modulator to mix the output waveform with a modulating waveform at a modulation frequency;

selecting a predetermined frequency from the amplitude modulated output to produce a signal which is representative of shifts in said phase difference, wherein said predetermined frequency is a harmonic of the modulation frequency; and measuring the phase of at least one component of said signal which is representative of shifts, to determine the rotation rate of the optical loop.

37. A method of detecting rotation rate as defined in claim 36 wherein the step of measuring the phase of at least one component comprises the step of comparing a selected component to a reference signal to produce a signal which is proportional to shifts in the counter-propagating light wave phase difference.

38. A method of detecting rotation rate as defined in claim 37 wherein the step of comparing a selected component to a reference signal comprises the step of measuring elapsed time between detection of an edge of a waveform of the reference signal and a zero crossing of the selected component waveshape on a horizontal axis to obtain the value which is proportional to shifts in the counter-propagating light wave phase difference.

39. A method of detecting rotation rate as defined in claim 36 wherein the step of measuring the phase of at least one component comprises the step of comparing a first selected component to a second selected component to produce a signal proportional to shifts in the counter-propagating light wave phase difference.

40. A method of detecting rotation rate as defined in claim 39 wherein the step of comparing a first selected component to a second component comprises the step of measuring elapsed time between a zero crossing of the first selected component waveform and a zero crossing of the second selected component waveform on a horizontal axis to obtain the value which is proportional to shifts in the counter-propagating light wave phase difference.

41. An apparatus for detecting rotation rate of an optical loop wherein light waves may be counter-propagated, the phase difference of the light waves being shifted in response to rotation of the optical loop and the light waves being combined to form an optical output signal, the apparatus comprising:
- a signal source for providing a phase modulation signal at a first selected frequency;
- a phase modulator responsive to the modulation signal for phaso modulating the counter-propagating waves at the first selected frequency;
- a detector for sesning the optical output signal and for providing a corresponding electrical output signal;
- an amplitude modulator circuit electrically connected to the output of the detector and responsive to the signal generator for mixing the output signal waveform with a modulating waveform to provide an amplitude modulated output signal at a second selected frequency;
- a delay circuit interposed between the amplitude modulator circuit and the signal source for delaying signals transmitted from the signal source to the amplitude modulator cirucit so as to synchronize operation of the amplitude modulator circuit with the waveform of hte electrical output signal; and
- a phase sensitive device for monitoring the phase of the amplitude modulated output signal at the second selected frequency in order to detect the phase shift in said output signal caused by rotation of the optical loop.

42. A method of detecting rotation rate of an optical loop having counter-propagating light waves therein whose phase difference is shifted by the rotation rate of the optical loop, comprising the steps of:
- combining the counter-propagating light waves to form an output having a waveform which corresponds to the phase difference of said light waves;
- passing the output through an amplitude modulator to mix the output waveform with a modulating waveform;
- selecting a predetermined frequency from the amplitude modulated output to produce a signal which is representative of shifts in said phase difference; and
- measuring elapsed time between detection of an edge of a waveform of the reference signal and a zero crossing of the selected component waveshape across a horizontal axis to obtain a value which is proportional to shifts in the counter-propagating light wave phase difference.

43. A method of detecting rotation rate of an optical loop having counter-propagating light waves therein whose phase difference is shifted by the rotation rate of the optical loop, comprising the steps of:
- combining the counter-propagating light waves to form an output having a waveform which corresponds to the phase difference of said light waves;
- passing the output through an amplitude modulator to mix the output waveform with a modulating waveform;
- selecting a predetermined frequency from the amplitude modulated output to produce a signal which is representative of shifts in said phase difference; and
- measuring elapsed time between a zero crossing of the first selected component waveform and a zero crossing of the second selected component waveform on a horizontal axis to obtain the value which is proportional to shifts in the counter-propagating light wave phase difference.

* * * * *